(12) United States Patent
Brief et al.

(10) Patent No.: US 8,190,462 B2
(45) Date of Patent: May 29, 2012

(54) SYSTEM AND METHOD FOR INTERNET BASED PROCUREMENT AND ADMINISTRATIVE MANAGEMENT OF WORKERS

(75) Inventors: Victor Brief, Brooklyn, NY (US); Andrew Cullen, III, Succasunna, NJ (US); Margaret Zarrelli, Morganville, NJ (US)

(73) Assignee: Volt Information Sciences, Inc., Orange, CA (US)

( * ) Notice: Subject to any disclaimer, the term of this patent is extended or adjusted under 35 U.S.C. 154(b) by 103 days.

(21) Appl. No.: 11/698,603

(22) Filed: Jan. 25, 2007

(65) Prior Publication Data

US 2007/0124196 A1  May 31, 2007

Related U.S. Application Data

(63) Continuation of application No. 10/031,866, filed as application No. PCT/US01/07962 on Mar. 13, 2001, now abandoned.

(60) Provisional application No. 60/188,922, filed on Mar. 13, 2000.

(51) Int. Cl.
*G06Q 10/00* (2012.01)

(52) U.S. Cl. ........................... 705/7.13; 705/321

(58) Field of Classification Search .............. 705/7.13, 705/321
See application file for complete search history.

(56) References Cited

U.S. PATENT DOCUMENTS

| | | | |
|---|---|---|---|
| 4,799,156 A | 1/1989 | Shavit et al. | |
| 4,937,743 A | 6/1990 | Rassman et al. | |
| 4,992,940 A | 2/1991 | Dworkin | |
| 5,117,353 A | * 5/1992 | Stipanovich et al. | 705/11 |
| 5,164,897 A | * 11/1992 | Clark et al. | 705/1.1 |
| 5,291,397 A | 3/1994 | Powell | |
| 5,381,332 A | 1/1995 | Wood | |
| 5,416,694 A | 5/1995 | Parrish et al. | |
| 5,493,490 A | 2/1996 | Johnson | |
| 5,592,375 A | 1/1997 | Salmon et al. | |
| 5,600,554 A | 2/1997 | Williams | |
| 5,664,115 A | 9/1997 | Fraser | |
| 5,715,402 A | 2/1998 | Popolo | |

(Continued)

FOREIGN PATENT DOCUMENTS

EP  1195676 A2  4/2002

(Continued)

OTHER PUBLICATIONS

Leipold et al., "The World Bank e-Procurement for the Selection of Consultants: Challenges and Lessons Learned" Journal of Public Procurement, vol. 4, Issue 3, pp. 319-339.

(Continued)

*Primary Examiner* — Beth V Boswell
*Assistant Examiner* — Folashade Anderson
(74) *Attorney, Agent, or Firm* — Winstead PC

(57) ABSTRACT

A system for internet-based procurement of non-cataloged goods and services based upon qualified resumes includes a human resources procurement server, an associate vendor terminal, and a hiring manager terminal. The associate vendor terminal is connected to the human resources procurement server. The hiring manager terminal is connected to the human resources procurement server. The human resources procurement server receives at least one job request from the hiring manager terminal. The human resources procurement server also receives at least one qualified resume from the associate vendor terminal and forwards the qualified resume to the hiring manager terminal for review.

31 Claims, 16 Drawing Sheets

U.S. PATENT DOCUMENTS

| | | |
|---|---|---|
| 5,740,421 A | 4/1998 | Palmon |
| 5,758,328 A | 5/1998 | Giovannoli |
| 5,794,212 A | 8/1998 | Mistr, Jr. |
| 5,802,493 A | 9/1998 | Sheflott et al. |
| 5,842,178 A | 11/1998 | Giovannoli |
| 5,862,223 A | 1/1999 | Walker et al. |
| 5,907,490 A | 5/1999 | Oliver |
| 5,913,202 A | 6/1999 | Motoyama |
| 5,915,086 A | 6/1999 | Buzsaki et al. |
| 5,960,407 A | 9/1999 | Vivona |
| 5,970,475 A | 10/1999 | Barnes et al. |
| 5,978,768 A * | 11/1999 | McGovern et al. ............ 705/1.1 |
| 5,987,464 A | 11/1999 | Schneider |
| 5,991,735 A | 11/1999 | Gerace |
| 5,995,951 A | 11/1999 | Ferguson |
| 6,014,644 A | 1/2000 | Erickson |
| 6,038,547 A | 3/2000 | Casto |
| 6,041,303 A | 3/2000 | Mathews |
| 6,049,776 A | 4/2000 | Donnelly et al. |
| 6,058,373 A | 5/2000 | Blinn et al. |
| 6,058,379 A | 5/2000 | Odom et al. |
| 6,070,143 A | 5/2000 | Barney et al. |
| 6,088,678 A | 7/2000 | Shannon |
| 6,092,050 A | 7/2000 | Lungren et al. |
| 6,092,197 A | 7/2000 | Coueignoux |
| 6,112,189 A | 8/2000 | Rickard et al. |
| 6,115,642 A | 9/2000 | Brown et al. |
| 6,131,087 A | 10/2000 | Luke et al. |
| 6,141,653 A | 10/2000 | Conklin et al. |
| 6,157,808 A | 12/2000 | Hollingsworth |
| 6,158,044 A | 12/2000 | Tibbetts |
| 6,161,099 A | 12/2000 | Harrington et al. |
| 6,167,385 A * | 12/2000 | Hartley-Urquhart ........... 705/35 |
| 6,189,003 B1 | 2/2001 | Leal |
| 6,199,050 B1 | 3/2001 | Alaia et al. |
| 6,213,780 B1* | 4/2001 | Ho et al. ...................... 434/219 |
| 6,266,659 B1* | 7/2001 | Nadkarni ............... 1/1 |
| 6,272,467 B1 | 8/2001 | Durand et al. |
| 6,275,812 B1 | 8/2001 | Haq et al. |
| 6,289,340 B1 | 9/2001 | Puram et al. |
| 6,302,695 B1 | 10/2001 | Rtischev et al. |
| 6,324,522 B2* | 11/2001 | Peterson et al. ................ 705/28 |
| 6,349,238 B1 | 2/2002 | Gabbita et al. |
| 6,356,909 B1 | 3/2002 | Spencer |
| 6,370,510 B1* | 4/2002 | McGovern et al. ......... 705/1.1 |
| 6,385,620 B1* | 5/2002 | Kurzius et al. ............. 707/104.1 |
| 6,408,337 B1 | 6/2002 | Dietz et al. |
| 6,442,528 B1 | 8/2002 | Notani et al. |
| 6,480,857 B1 | 11/2002 | Chandler |
| 6,529,909 B1 | 3/2003 | Bowman-Amuah |
| 6,556,976 B1 | 4/2003 | Callen |
| 6,647,300 B1 | 11/2003 | Balasubramanian et al. |
| 6,658,400 B2 | 12/2003 | Perell et al. |
| 6,662,194 B1* | 12/2003 | Joao ............... 705/1.1 |
| 7,054,821 B1 | 5/2006 | Rosenthal et al. |
| 7,089,203 B1 | 8/2006 | Crookshanks |
| 7,103,567 B2 | 9/2006 | Smukowski |
| 7,107,268 B1 | 9/2006 | Zawadzki et al. |
| 7,275,039 B2 | 9/2007 | Setteducati |
| 7,305,392 B1 | 12/2007 | Abrams et al. |
| 7,386,475 B2 | 6/2008 | Parasnis et al. |
| 7,430,523 B1 | 9/2008 | Khalidi |
| 7,437,304 B2 | 10/2008 | Barnard et al. |
| 7,451,106 B1 | 11/2008 | Gindlesperger |
| 7,457,764 B1* | 11/2008 | Bullock et al. ............... 705/7.14 |
| 7,523,045 B1* | 4/2009 | Walker et al. ..................... 705/8 |
| 7,533,033 B1 | 5/2009 | Unite et al. |
| 7,653,583 B1 | 1/2010 | Leeb et al. |
| 7,805,382 B2* | 9/2010 | Rosen et al. ................. 705/321 |
| 2001/0044768 A1 | 11/2001 | Wares |
| 2001/0051913 A1 | 12/2001 | Vashistha et al. |
| 2002/0002479 A1 | 1/2002 | Almog et al. |
| 2002/0046147 A1 | 4/2002 | Livesay et al. |
| 2002/0055870 A1 | 5/2002 | Thomas |
| 2002/0072946 A1 | 6/2002 | Richardson |
| 2002/0073082 A1 | 6/2002 | Duvillier et al. |
| 2002/0087382 A1 | 7/2002 | Tiburcio |
| 2002/0103687 A1* | 8/2002 | Kipling ............. 705/8 |
| 2002/0152133 A1 | 10/2002 | King et al. |
| 2002/0156668 A1 | 10/2002 | Morrow et al. |
| 2002/0161619 A1 | 10/2002 | Ham et al. |
| 2002/0198766 A1 | 12/2002 | Magrino et al. |
| 2002/0198818 A1 | 12/2002 | Scott et al. |
| 2003/0004850 A1 | 1/2003 | Li et al. |
| 2003/0018481 A1 | 1/2003 | Zhou et al. |
| 2003/0037032 A1* | 2/2003 | Neece et al. ...................... 707/1 |
| 2003/0055694 A1 | 3/2003 | Menninger |
| 2003/0055754 A1 | 3/2003 | Sullivan |
| 2003/0083910 A1 | 5/2003 | Sayal et al. |
| 2003/0101114 A1 | 5/2003 | Delapass et al. |
| 2003/0101127 A1 | 5/2003 | Cornelius |
| 2003/0135401 A1 | 7/2003 | Parr |
| 2003/0145006 A1 | 7/2003 | Dalfsen et al. |
| 2003/0177051 A1 | 9/2003 | Driscoll et al. |
| 2003/0200150 A1 | 10/2003 | Westcott et al. |
| 2003/0200168 A1 | 10/2003 | Cullen, III et al. |
| 2003/0204439 A1 | 10/2003 | Cullen, III |
| 2003/0208434 A1 | 11/2003 | Posner |
| 2003/0212604 A1 | 11/2003 | Cullen, III |
| 2003/0216986 A1 | 11/2003 | Hassan |
| 2004/0030566 A1 | 2/2004 | Brooks Rix |
| 2004/0030590 A1 | 2/2004 | Swan et al. |
| 2004/0039681 A1 | 2/2004 | Cullen, III et al. |
| 2004/0068728 A1 | 4/2004 | Blevins |
| 2004/0093583 A1 | 5/2004 | McAnaney et al. |
| 2004/0107125 A1 | 6/2004 | Guheen et al. |
| 2004/0107405 A1 | 6/2004 | Schein |
| 2004/0158513 A1 | 8/2004 | Musacchio |
| 2004/0186852 A1 | 9/2004 | Rosen |
| 2004/0205519 A1 | 10/2004 | Chapel et al. |
| 2004/0210490 A1 | 10/2004 | Almstead et al. |
| 2004/0210510 A1 | 10/2004 | Cullen, III et al. |
| 2004/0215467 A1 | 10/2004 | Coffman et al. |
| 2004/0236598 A1 | 11/2004 | Thomsen |
| 2004/0260601 A1 | 12/2004 | Brief |
| 2004/0267606 A1 | 12/2004 | Brishke et al. |
| 2005/0114829 A1 | 5/2005 | Robin |
| 2005/0120039 A1 | 6/2005 | Amys et al. |
| 2005/0144129 A1 | 6/2005 | Coolman et al. |
| 2005/0262008 A1 | 11/2005 | Cullen, III et al. |
| 2005/0288993 A1 | 12/2005 | Weng et al. |
| 2006/0173775 A1 | 8/2006 | Cullen et al. |
| 2006/0190391 A1 | 8/2006 | Cullen et al. |
| 2006/0259476 A1 | 11/2006 | Kadayam et al. |
| 2008/0004890 A1 | 1/2008 | Hargroder |
| 2009/0248482 A1 | 10/2009 | Knyphausen et al. |
| 2010/0241482 A1 | 9/2010 | Knyphausen et al. |

FOREIGN PATENT DOCUMENTS

| | | |
|---|---|---|
| JP | 2002-041835 A | 2/2002 |
| JP | 2004-086757 A | 3/2004 |
| RU | 2165679 C1 | 4/2001 |
| WO | WO-00/33187 A1 | 6/2000 |
| WO | WO-/00/50970 | 8/2000 |
| WO | WO-01/14962 A1 | 3/2001 |
| WO | WO-01/48656 | 7/2001 |
| WO | WO-02/08868 | 1/2002 |
| WO | WO-02/25544 | 3/2002 |
| WO | WO-02/41270 A1 | 5/2002 |

OTHER PUBLICATIONS

U.S. Appl. No. 11/885,090, Cullen et al.

Consol (www. procurestaff.com via http://web.archive.org, copyright 2003) pp. (1-31).

Cullen, Andrew A. III, "Declaration of Andrew A. Cullen III", 41 pages, Jun. 18, 2008.

"nextSource Announces Launch of its Multiple Listing Staffing Association." Business Wire, p. 2196, Apr. 16, 2002.

Definition of prose from Dictionary.com, retrieved from [http://dictionary.reference.com/browse/prose] on Aug. 7, 2008 (5 pages).

Dysart, J., "The Data Exchange, "DG Review, vol. 11, No. 9, p. 37, Mar. 11, 1991.

Anon., "Primavera Systems; Primavera, PurchasePro.Com Create E-Commerce Marketplace for Construction Industry, " M2 Presswire, Sep. 22, 1999.

Rawdon, S., "Online Bidding Options May Be Web's Best Secret," Business First-Columbus, vol. 18, No. 33, p. B11, Apr. 5, 2002.
www.marketing.ebreviate.com; "Overview"; Company Information of eBreviate; Feb. 11, 2002; pp. 1-16.
www.chimes.net; "Chimes Streamlines & Digitizes RFP Administration and Project Management with Launch of Chimes PM"; Press Release from Chimes, Inc.; Feb. 25, 2002; pp. 1-4.
www.chimes.net; "Chimes, Inc. Extends Human Capital Management Solution Beyond Contingent Workforce with Launch of Centralized Applicant Management—CAM—Program"; News Room from Chimes, Inc.; Jun. 28, 2001; pp. 1-2.
www.emptoris.com; "Overview"; Company Overview of Emptoris; Apr. 15, 2002; pp. 1-18.
Screenshots of Volt Information Sciences, www.volt.com, Feb. 21, 1999, pp. 1-24, retrieved from: Google.com and archive.org.
Torres, Giselle; "High-Voltage Staffing Service Arrives in Puerto Rico"; Caribbean Business; Oct. 23, 1997, p. 1 (retrived from: Dialog, file 16).
"Volt Information Sciences—Facilities & Equipment", Annual Report, 1989, p. 1 (retrieved from : Dialog, file 160.
"Volt Information Sciences to Purchase Portions of Two Lucent Technologies Subsidiaries", PR Newswire, Nov. 17, 1999, pp. 1-3, (retrieved from: Dialog, file 16.
marketing.ebreviate.com; "Overview"; Company Information of eBreviate; Feb. 11, 2002; pp. 1-16.
U.S. Appl. No. 12/492,438, Cullen.
U.S. Appl. No. 12/342,116, Cullen.
Cullen, A., Suppliers of Technical Nonpayroll Workers, (2 pages), Dec. 31, 1997.
Cullen, A., Skills Questionnaire, (5 pages), May 21, 1998.
Cullen, A., Skills Environment, (1 page), Jul. 2, 1998.
Cullen, A., Jobs Listing, (31 pages), Feb. 24, 1999.
Brief, V., Overview of Bolt's HRP Application, (3 pages), Feb. 1999.
Herman, Susan J. Hiring Right: A Practical Guide. SAGE. 1994. pp. 23-25.
U.S. Appl. No. 12/692,937, Cullen.
Bajari et al. (Bajari), "Incentives versus transaction cost: a theory of procurement contracts", RAND Journal of Economics, vol. 32, No. 3, Autumn 2001, pp. 387-407.
U.S. Appl. No. 12/773,130, Cullen.
U.S. Appl. No. 12/855,532, Wasicek.
U.S. Appl. No. 12/871,725, Shaw.
Copenheaver, Blaine R., "International Search Report" for PCT/US2010/045349 as mailed Oct. 6, 2010 (4 pages).
Young, Lee W., "International Search Report" for PCT/US10/47176 as mailed Oct. 14, 2010, 3 pages.
Cullen, III, et al., U.S. Appl. No. 13/017,760, filed Jan. 31, 2011.
Web Archive of "nextSource" web page, "People Blue Book™, Introducing the nextSource People Blue Book" retrieved from [URL: http://web.archive.org/web/20020206061453/http://nextsource.com/services/people_blue...], archived on Feb. 6, 2002, 1 page.
U.S. Bureau of Labor Statistics, "2000 Standard Occupational Classification (SOC) User Guide", retrieved from [URL: http://data.bls.gov/cgi-bin/print.pl/soc/socguide.htm] on Dec. 27, 2011, 5 pages.

* cited by examiner

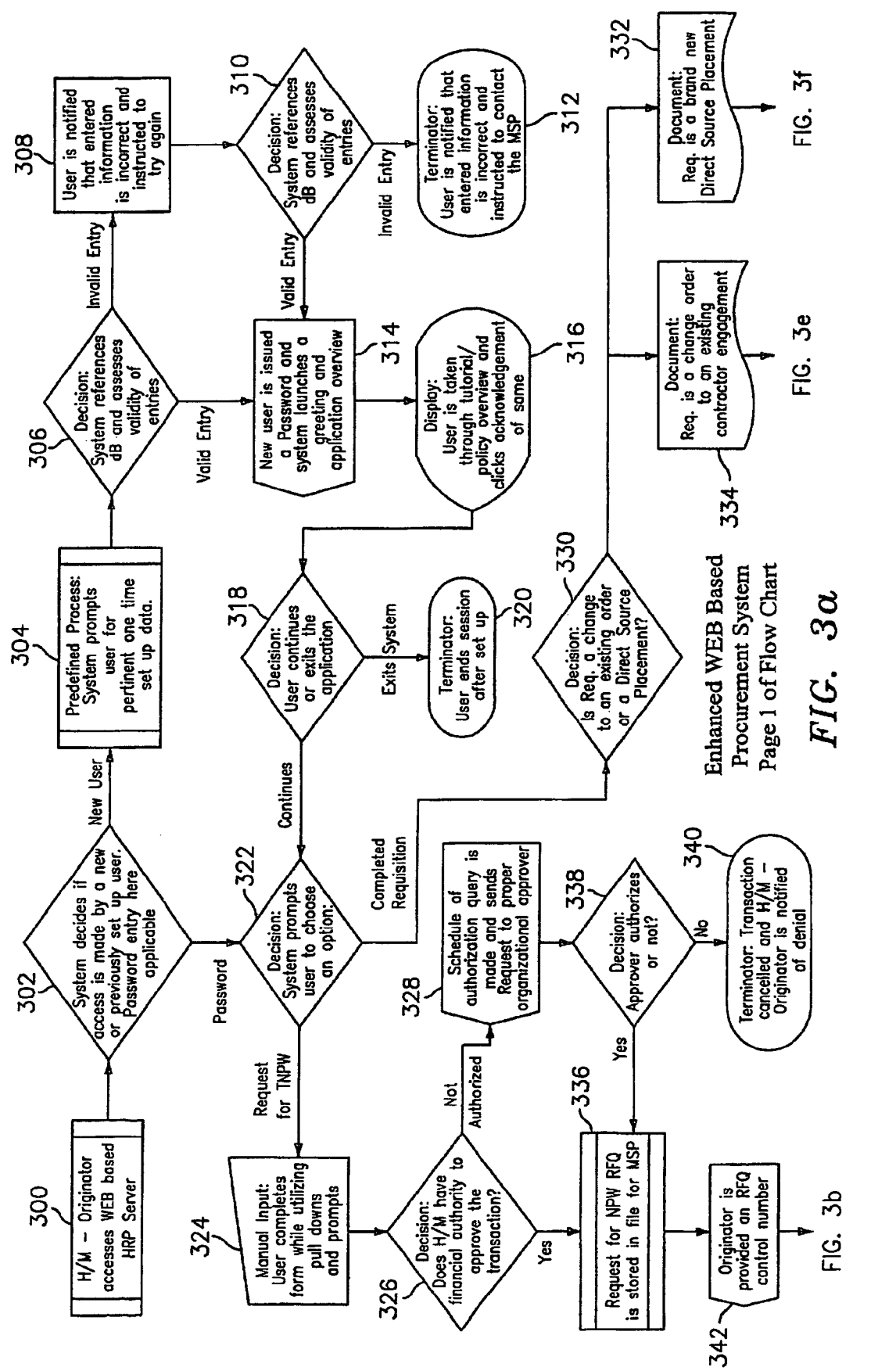

Change Order Requisition Processing
Page 5 of Flow Chart

FIG. 3a →

334 — Document: Req. is a change order to an existing contractor engagement

Approvals:
Tenure over 18 Months Forwards Approval Notice to the Fifth Level Mgr.
Hourly Rate increases greater than 4% Forwards Approval Notice to Next Level Mgr.
Vendor is not under contract with GPO Forwards Approval Notice to the Fifth Level Mgr.

436 — Decision: Are additional approvals needed for this requisition?

Yes → 448 Decision: Requisition gets approved?
 - No → 450 Terminator: H/M is informed that contractor will not be extended and Requisition is cancelled
 - Approved →

No → 438 Document: Approved Requisition is stored in file for MSP

440 — Process: MSP Admin. accesses approved Requisition and triggers PO update routine in System

442 — Process: System uploads modified PO data into the System

444 — Document: PO from HRP system is E-Mailed to Supplier

446 — Terminator: Process: order information is transmitted to HRP and H/M E-Mailed that changes were affected HRPs

FIG. 3e

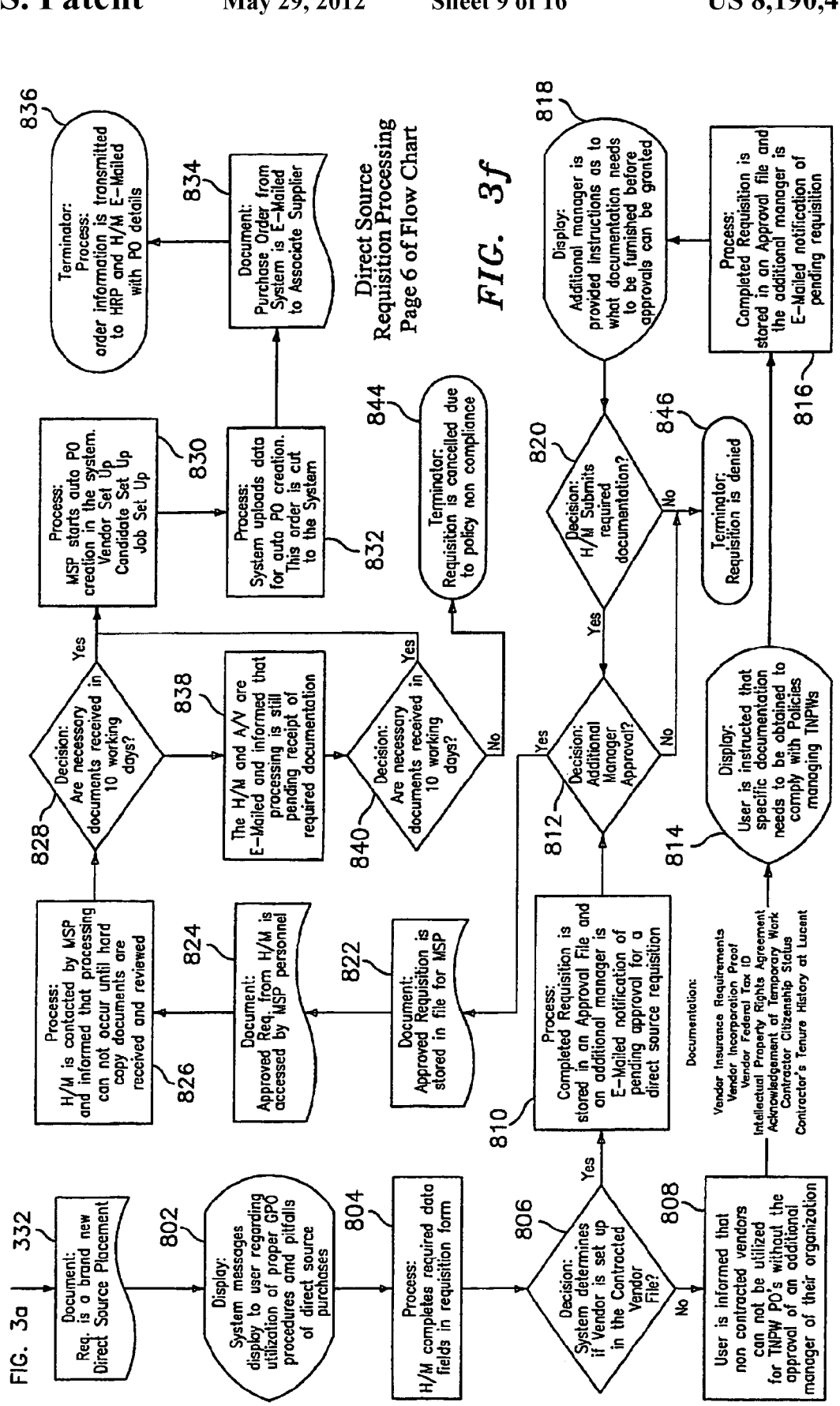

SYSTEM AND METHOD FOR INTERNET BASED PROCUREMENT AND ADMINISTRATIVE MANAGEMENT OF WORKERS

This patent application is a continuation application of, and incorporates by reference the entire disclosure of, U.S. patent application Ser. No. 10/031,866 now abandoned, which is a national-stage filing of International Patent Application No. PCT/US01/07962, filed on Mar. 13, 2001. International Patent Application No. PCT/US01/07962 claims priority from U.S. Provisional Patent Application No. 60/188,922, filed Mar. 13, 2000. This patent application incorporates by reference the entire disclosure of U.S. Provisional Patent Application No. 60/188,922.

BACKGROUND OF THE INVENTION

1. Field of the Invention

The present invention relates to a system and method for the procurement and management of contingent workforce using proprietary systems, processes and methodologies.

2. Discussion of Related Art

Technical projects, for example, the development of computer software, typically require large numbers of skilled workers. However, the amount of work force necessary to complete such projects fluctuates greatly during and between such projects. It is not cost effective for companies to hire and retain the large number of workers required to complete each project. Therefore, companies in need of skilled workers generally hire consulting firms to fill the positions. A company representative, generally a hiring manager ("H/M"), will typically send a job description and workforce requirements to an outside consulting firm or firms to fill the needed positions. This process is oftentimes complicated and time consuming.

U.S. Pat. No. 5,970,475 to Barnes et al., entitled "Electronic Procurement System and Method for Trading Partners", discloses a system that enables corporate purchasers and suppliers to electronically transact for the purchase and supply of goods and services. The system software is used for operating a customer server, a supplier processor server and a supplier catalog server. The supplier system includes a catalog and an order processor wherein the catalog contains information regarding all of the suppliers' goods made available to the customer organization. Unfortunately, the system only presents those goods and services that are stored in a catalog. This configuration is ill suited for the rapidly changing job placement field wherein the number of employment positions and available employees fluctuates daily.

U.S. Pat. No. 5,117,353 to Stipanovich et al., entitled "System for Use in a Temporary Help Business", discloses a system that schedules personnel suited to particular tasks for work on a temporary basis. Temporary help applicants are screened and their particular skills are matched to client job orders. Those temporary help employees whose skills and availability match the job order are contacted by phone and asked if they would accept the position. If accepted, the client is notified by phone that a match has been made. This only allows for staffing firms to properly fill their orders received from clients. It does not allow clients to select candidates.

U.S. Pat. No. 5,978,768 to McGovern et al., entitled "Computerized Job Search System and Method for Posting and Searching Job Openings Via a Computer Network", discloses a system that enables an employer to advertise available positions on the Internet and directly receive resumes from prospective candidates. The system stores the received resumes in relation to the position for which the job applicant is applying. The human resource hiring contact can then select a position, view the received resumes for that position and score the resumes to determine if there is a match. This is well suited for situations where managers are hiring full time employees directly. There is no process for submitting and receiving orders from consulting firms that provide addition hr-related services, such as screening the candidates, supplying benefits, etc.

Therefore, there exists a need for a methodology and process for the procurement of temporary contracting services using efficiencies enabled via web based systems and procurement methodologies.

SUMMARY OF THE INVENTION

It is therefore an object of the present invention to provide a system and method for the Internet based procurement of non-cataloged services.

It is an additional object of the present invention to provide a system and method for the Internet based procurement of goods and services that allows great flexibility in adding and removing job openings and potential employees.

It is a further object of the present invention to provide a system and method for the Internet based procurement of goods and services which tracks the life cycle of a temporary placement employment opportunity.

It is still another object of the present invention to provide a system and method for the Internet based procurement of goods and services that maintains time and billing information pertaining to temporary help personnel.

It is still another object of the present invention to provide a system and method for the Internet based procurement of goods and services as well as allowing for a method of resource redeployment.

It is still another object of the present invention to provide a system and method for the Internet based procurement of goods and services that will allow vendor competition to allow for pricing of requested service.

It is still another object of the present invention to provide a system and method for the Internet based procurement of goods and services that will allow accurate skill set definition for requested resource using a hierarchical skill set drill down process.

It is still another object of the present invention to provide a system and method for the Internet based procurement of goods and services that will allow for the management of temporary services throughout the assignment lifecycle; including terminations, extensions, and changes.

It is still another object of the present invention to provide a system and method for the Internet based procurement of goods and services that will capture the time worked by a temporary employee.

It is still another object of the present invention to provide a system and method for the Internet based procurement of goods and services that will allow clients to be billed directly based on time worked by a temporary employee.

It is still another object of the present invention to provide a system and method for the Interet based procurement of goods and services that will allow vendors to be paid directly based on time worked by a temporary employee.

To achieve these and other objects of the present invention, there is provided a system and method for the Internet based procurement of goods and services. The system is comprised of a human resources procurement ("HRP") server connected to the Internet and a plurality of associate vendors ("A/V's") connected to the human resources procurement server either directly or through the Internet. When a hiring manager ("H/

M") of a company requires temporary help, the H/M can access the HRP server either directly or through the Internet. The H/M enters a job description into a job database stored in the HRP server and enters any pertinent job requirements. If the job descriptions require more detail, the associate vendors can request additional information online. The associate vendors access the job database and match qualified job applicants with the job descriptions. Only the resumes of qualified job applicants are forwarded to the hiring manager. Hiring Managers using the system are able to review, on-line, the resume and quotes submitted by each associate vendor. If the hiring manager approves the job applicant, an interview is setup to make the final determination concerning employment. The A/V's are notified, typically via email, whether or not their proposals require an interview. If so, the system keeps track of the candidate's availability and updates the records accordingly. If the candidate is offered the job, the managed service program ("MSP") specialist concludes the final negotiations with the H/M and closes the deal. Once approved, the employee can submit time slips to the HRP server, which forwards it to the manager ("HM") for approval. Once approved, the time is matched against the contract bill rate and an invoice is generated to the client, and a payment is generated to the vendor with the contracted terms. The job status can be tracked for human resource, financial, tracking and other purposes.

The method for the Internet based procurement of goods and services comprises the steps of receiving a request, forwarding the request to A/V's, receiving resumes from the A/V's, qualifying resumes, forwarding qualified resumes to a hiring manager, coordinating an interview, notifying the A/V is a candidate is declined, and processing the hire of a successful employee.

BRIEF DESCRIPTION OF THE DRAWINGS

Other objects and features of the present invention will become apparent from the following detailed description considered in connection with the accompanying drawings, which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 3a is a call flow diagram illustrating the method for the Internet based procurement of goods and services according to the present invention;

FIG. 3b is a continuation of the call flow diagram of FIG. 3a;

FIG. 3e is a continuation of the call flow diagram of FIG. 3a;

FIG. 3f is a continuation of the call flow diagram of FIG. 3a;

FIG. 7b is a continuation of the call flow diagram illustrating a method for changing a purchase order according to FIG. 7a;

FIG. 7c is a continuation of the flow diagram illustrating the method for changing a purchase order according to FIG. 7a; and FIG. 7d is a continuation of the call flow diagram illustrating the method for changing a purchase order according to FIG. 7a.

DETAILED DESCRIPTION OF PREFERRED EMBODIMENTS

Turning to the drawings, a preferred embodiment of the present invention is described herein below in detail with reference to the accompanying drawings.

The present invention is a complete paperless web based requisition to pay application for the procurement of temporary personnel. The present invention is delivered as a hosted application, with clients accessing the application via the internet. Personalization and incorporation of client's business rules is available to customize the present invention to the needs of many different clients.

Figure 1:
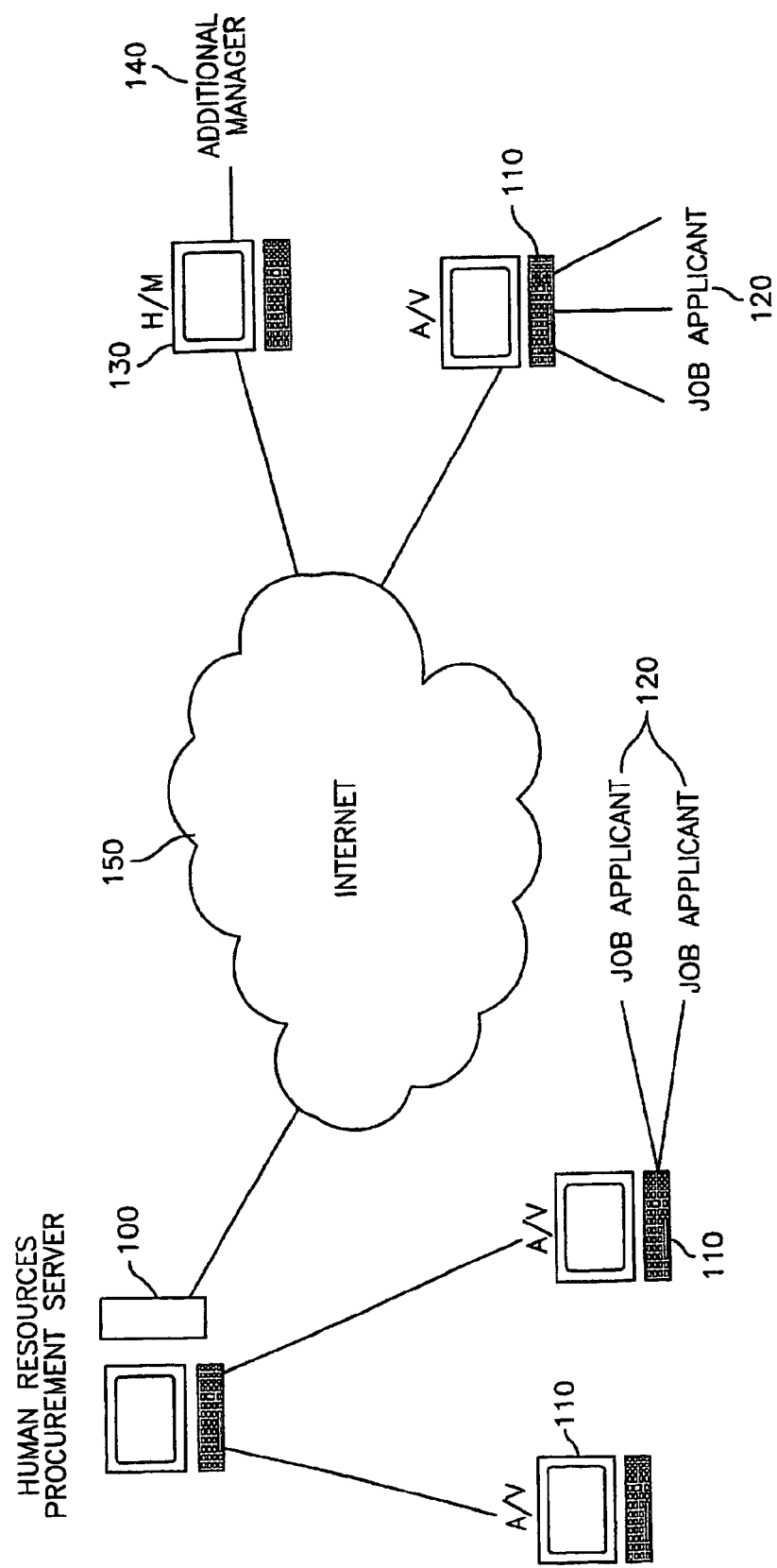
FIG. 1 is a schematic view of a reference model for the system for the Internet based procurement of goods and services according to the present invention.

FIG. 1 shows a system for the Internet based procurement of temporary services based upon qualified resumes according to the present invention. The system is comprised of a human resources procurement ("HRP") server 100 connected to the Internet 150 and a plurality of associate vendor terminals 110 ("A/V's") connected to human resources procurement server 100 either directly or through the Interet 150. When at least one hiring manager terminal 130 ("H/M") requests temporary help, the H/M 130 accesses HRP server 100 either directly or through the Internet 150. At least one job applicant 120 submits a resume to A/V 110 in the hopes of obtaining employment. An additional manager terminal 140 is connected to the H/M terminal 130 and the Internet 150 and may be required to approved the actions of the H/M terminal 130.

Figure 1A:
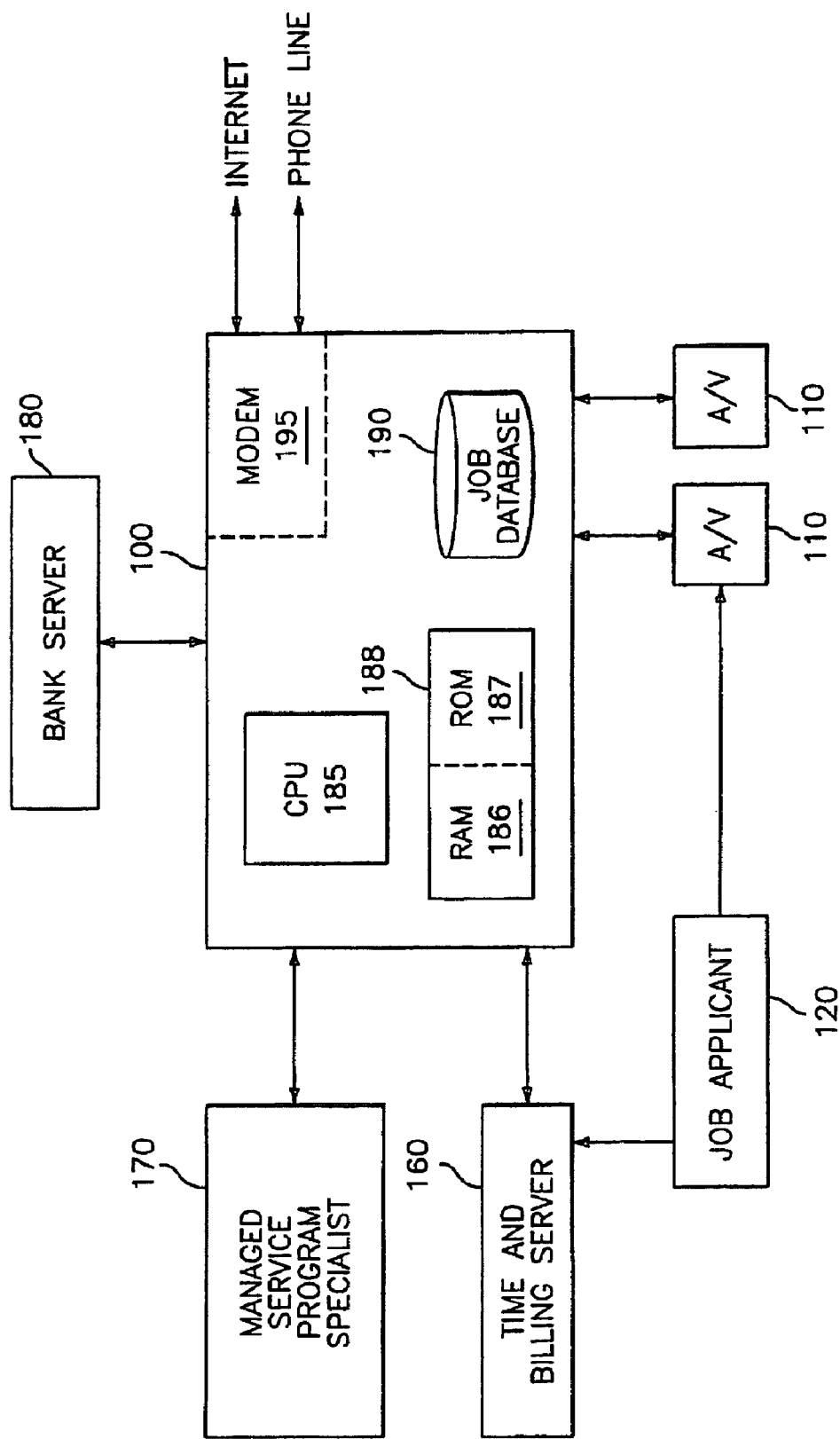
FIG. 1a is a schematic view of the Human Resources Procurement server of FIG. 1.

Referring to FIG. 1a, the HRP server 100 is comprised of a central processing unit ("CPU") 185, a memory 188 including a random access memory 186 ("RAM") and a read only memory 187 ("ROM"), a modem 195 and a job database 190. CPU 185 controls the overall operation of the HRP server 100. In addition, ROM 187 stores a control program that is used to control the operation of HRP server 100 while RAM 186 temporarily stores a qualified resume. H/M 130 enters a job description into job database 190 stored in the HRP server and enters any pertinent job requirements. If the job descriptions require more detail, the associate vendor terminal 110 can request additional information online from the HRP server 100 and the hiring manager 130. The associate vendor terminal 110 accesses job database 190 and matches qualified job applicants 120 with the job descriptions. When the A/V terminal 110 is ready to submit a job applicant 120, A/V terminal 110 will access the application either directly or via the Internet and submit the candidate information and attach a resume. There is no software installation required of the A/V terminal 110, as the application can be accessed via a web browser using any connection to the Internet, even a dial-up connection.

Only the resumes of qualified job applicants are forwarded to the hiring manager 130 by the associate vendors 110. In addition, CPU 185 only permits associate vendor terminal 110 to access those job descriptions that hiring manager terminal 130 has authorized for that associate vendor terminal 110. The vendors 110 can be divided by any algorithm such as: Location, Skill Set, Tiers, Business Unit, Customer, etc; and a desired subset of vendors can receive notification when a new job description is posted in an area that they have access to view. Hiring Manager 130 using the system is able to review, on-line, the resume and quotes submitted by each associate vendor 110. If the hiring manager 130 approves the job applicant 120, an interview is setup to make the final determination concerning employment. The A/V's 110 are notified, typically via email, whether or not their proposals require an interview. If so, the system keeps track of the candidate's availability and updates the records accordingly. If the candidate is offered the job, a managed service program ("MSP") specialist terminal 170 concludes the final negotiations with the H/M 130 and closes the deal. Once approved, the A/V 110 is notified of the acceptance, and a purchase order is created requesting the employee for the specified position. The employee can submit a time slip to the HRP server 100, and the job status can be tracked for human resource purposes.

A bank server 180 and a time and billing server 160 are connected to the HRP server 100 and allow for the generation and collection of invoices pertaining to temporary employment positions. On a daily/weekly basis the qualified job applicant has the ability to report his time worked. This reporting can be done via paper time cards, the Internet, touch-tone telephone, and/or wireless devices. The time and billing server 160 has the ability to capture additional job related information, such as project codes, client's id's, etc. The reported time is validated for duplication, PO limits, Time constraints, Project Codes, as well as various other verifications. The invoices are generated by time and billing server 160 in response to the time slips entered by the employees. The completed time card is then sent to the approving manager for approval. In addition, the A/V has access to their contractors' timecards online. Multiple approval processes for the timecard are available including: Negative verification—Timecard is assumed to be correct unless declined, Wait for approval—Timecard is not billed/paid until approved, or a mixture—If not approved within X days it is assumed valid. The timecard approval process is a simple intuitive process, with the manager able to approve time cards in one bulk operation without going through each time card individually. Separate invoices can be created by any grouping and/or be delivered as one consolidated invoice. The invoice(s) is/are then sent to hiring manager terminal 130 for payment. Payment is then forwarded to the HRP server 100 via bank server 180 and distributed to A/V 110 after expenses have been deducted.

Figure 2:
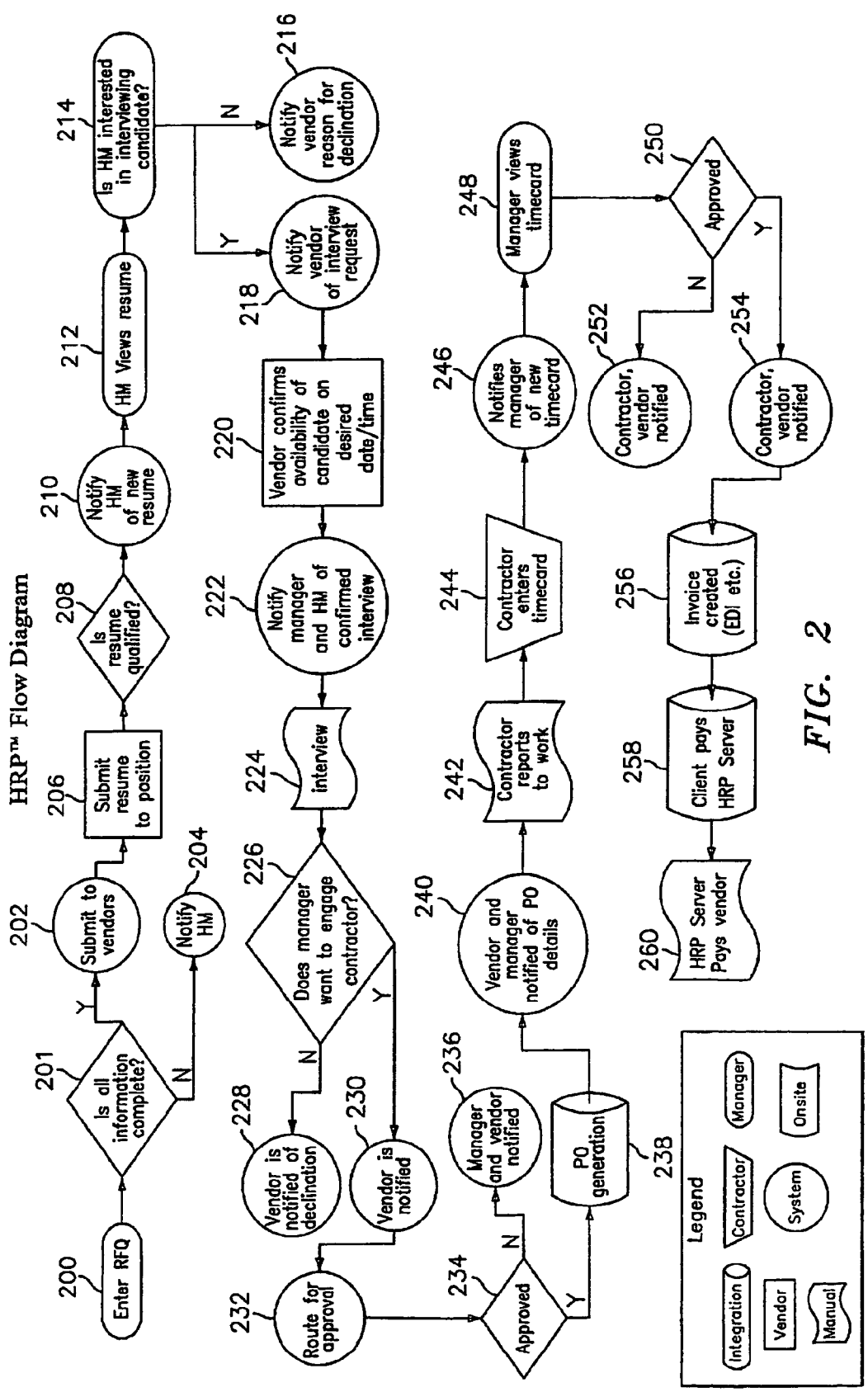
FIG. 2 is a flow diagram of the overall method for the Internet based procurement of goods and services according to the present invention.

FIG. 2 shows a flow diagram of the overall method for the Internet based procurement of temporary services based upon qualified resumes. Step 200 enters a request for quote ("RFQ"), which contains the details of a job description. Step 201 checks the information for completeness, and, if the information is complete, and an onsite representative has manually confirmed that the requisition is viable and meets all the client's policies, step 202 submits the requisition to the client's approved vendor base via an email. The vendors can be divided by any algorithm such as: Location, Skill Set, Tiers, Business Unit, Customer, etc; and a desired subset of vendors can receive notification. If information is missing or incomplete, the hiring manager is notified in step 204 of the missing information. Step 206 submits resumes that match the job description, while in step 208, it is determined which resumes are qualified based upon the job description. If the resumes are qualified, step 210 notifies the hiring manager of the new resume. Next, the hiring manager views the qualified resume in step 212. This process of viewing only qualified resumes saves the hiring manager countless hours in the hiring of temporary help personnel. In step 214, it is determined whether the H/M is interested in interviewing the job applicant. If not, step 216 notifies the A/V of the reason for declination. If an interview is requested, step 218 notifies the A/V of the interview request. The A/V confirms the availability of the job applicant on the specified date in step 220 and notifies the H/M of the confirmed interview in step 222. An interview is conducted in step 224 and step 226 determines whether the manager decides to hire the prospective job applicant candidate. If the applicant is not hired, step 228 notifies the A/V of the declination. If the applicant is hired, step 230 notifies the A/V and the application is routed for approval in step 232. In step 234, it is determined whether the application is approved. If not, step 236 notifies the H/M and A/V. If so, step 238 generates a purchase order ("PO") requesting the services of the new employee. The A/V and the H/M are notified of the purchase order details in step 240 and the newly hired employee, now a contactor, reports to work in step 242. After the contractor has worked for a period of time, the contractor enters their timecard in step 244. Step 246 notifies the manager of the new timecard and the manager reviews the timecard in step 248. In step 250, it is determined whether the timecard is approved. If not, step 252 notifies the contractor and A/V. If the tirecard is approved, step 254 notifies the A/V and an invoice is created in step 256. The hiring manger client pays the invoice in step 258 and the vendor and contractor are paid in step 260.

Figure 3B:
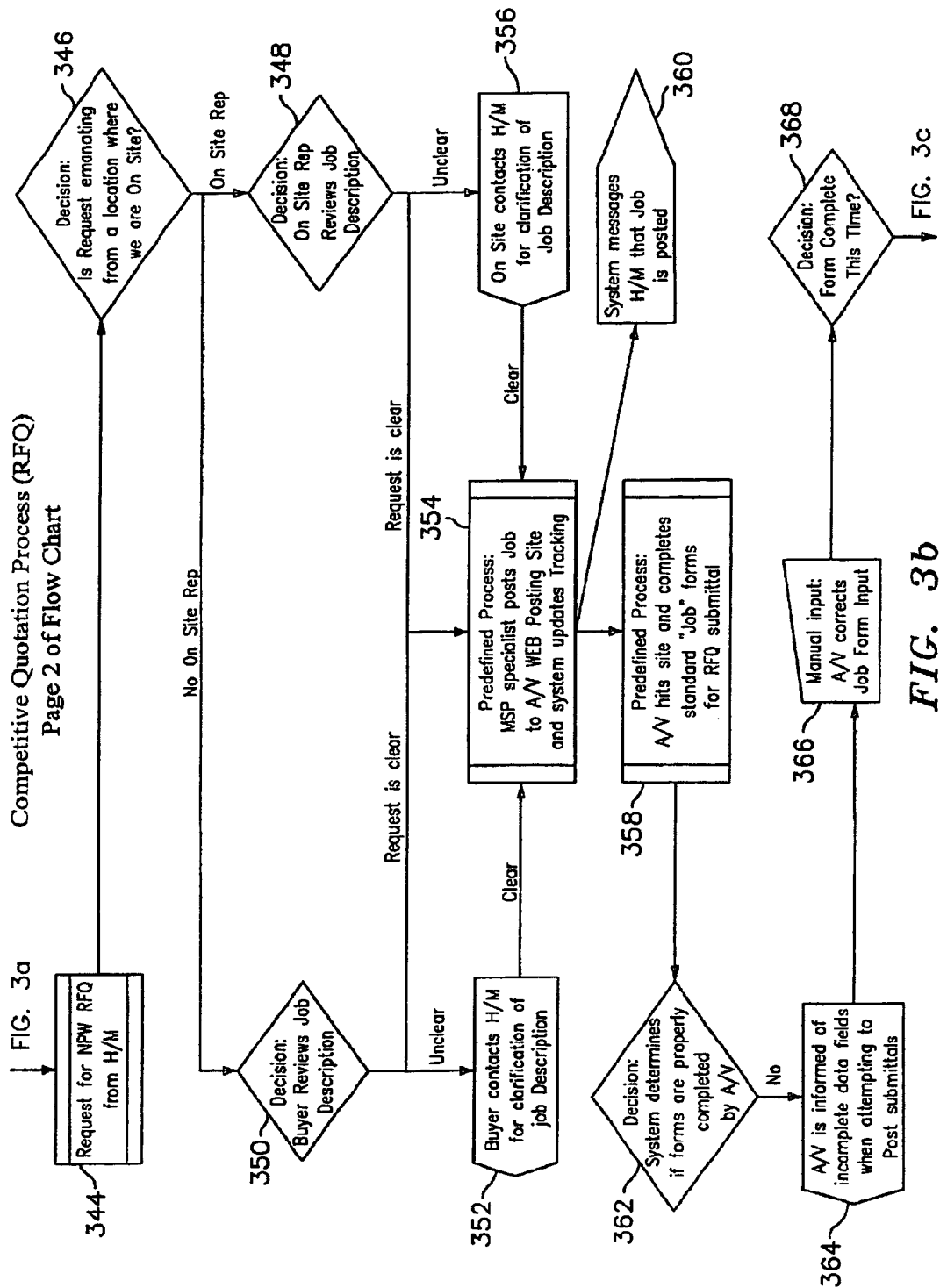

Referring to FIG. 3a, a detailed flow diagram of the method for the Internet based procurement of temporary services based upon qualified resumes is described. A hiring manager accesses the Internet based HRP Server in step 300. Step 302 determines if the H/M is a new user or previous user and requests a password. If the H/M is new, step 304 prompts the user for pertinent setup information. The system then determines in step 306 whether the user is a valid user according to a database of allowable H/M's. If the user is invalid, step 308 prompts the user to reenter the data. The system then determines in step 310 whether the user is a valid user according to the database of allowable H/M's. If the entry is invalid, step 312 terminates the access. If the entry is valid in either step 306 or step 310, step 314 issues the new H/M a password and displays a brief tutorial in step 316. Step 318 determines whether the new user wishes to continue with the application. If not, the application terminates in step 320. If the user wishes to continue, step 322 prompts the user to choose an option. In addition, if the user was a previous user and entered a password in step 302, the user would be directed to step 322. From step 322, the user may choose to manually enter a technical non-payroll worker in step 324 or work on a completed requisition in step 330. If the H/M chooses to enter a request in step 324, step 326 determines whether the H/M has the authority to approve the transaction. If not, step 328 requests the proper authorization from a predetermined list of managers. Step 338 determines if the appropriate manager approved the request. If not, the process ends in step 340. If the request is approved in step 338 or the H/M did have original authority to approve the transaction, step 336 stores the request in a job database for review by a managed service program personnel. The system maintains the job description profiles entered by the H/M in a way that allows for easy modification and addition by the system administrators. There is also the ability to enter any additional information or skills that to the predetermined profiles. A manager can save a profile for easy reuse in the future. Step 342 provides the H/M with a RFQ control tracking number for future tracking purposes. The process continues with step 344 of FIG. 3*b*.

FIG. 3*b* discloses the continuation of the process of FIG. 3*a*. Step 344 indicates that a request has been entered for a new position. Step 346 then determines whether the H/M generating the request is from a location that has an on-site representative. The onsite representative may advise the manager to issues such as skills availability, feasibility of rates and/or lead-time, or any other issues the manager must be informed about. If there is no on-site representative, the process proceeds to step 350, else the process proceeds to step 348. In step 350 a buyer reviews the job description while in step 348 the on-site representative reviews the job description. If the job description is unclear, either step 352 or 356, respectively, contacts the H/M for clarification. If the request is clear, steps 350 and 348 proceed to step 354 where the job is posted and the system updates the job status tracking. Step 360 notifies the H/M that the job is posted. In step 358, the A/V views the jobs that are posted and submits resumes for consideration. The vendor has the ability to view only those positions to which he is allowed to respond. In environments where a resume is not required, (clerical, light industrial, etc.) the vendor is asked to complete a candidate profile. If desired, this profile can be required even if accompanied by a resume. Any additional required fields can be captured from the A/V. Common required fields include: bill rate, overtime rate, candidate's eligibility of employment, available to start date, education, certifications, previous experience, etc. Vendors can also be forced to conform to a predetermined rate card, and not be allowed to submit above the rate range. Upon submittal the vendor is notified via email of its receipt. The vendor also has the ability to access the site and track the status of the submittal at any stage of the process. Step 362 determines whether the A/V submission is completed properly and step 364 notifies the A/V of any incomplete fields. The A/V can correct the submission in step 366 and step 368 determines again if the submission is complete. The process continues in FIG. 3*c*.

Figure 3C:
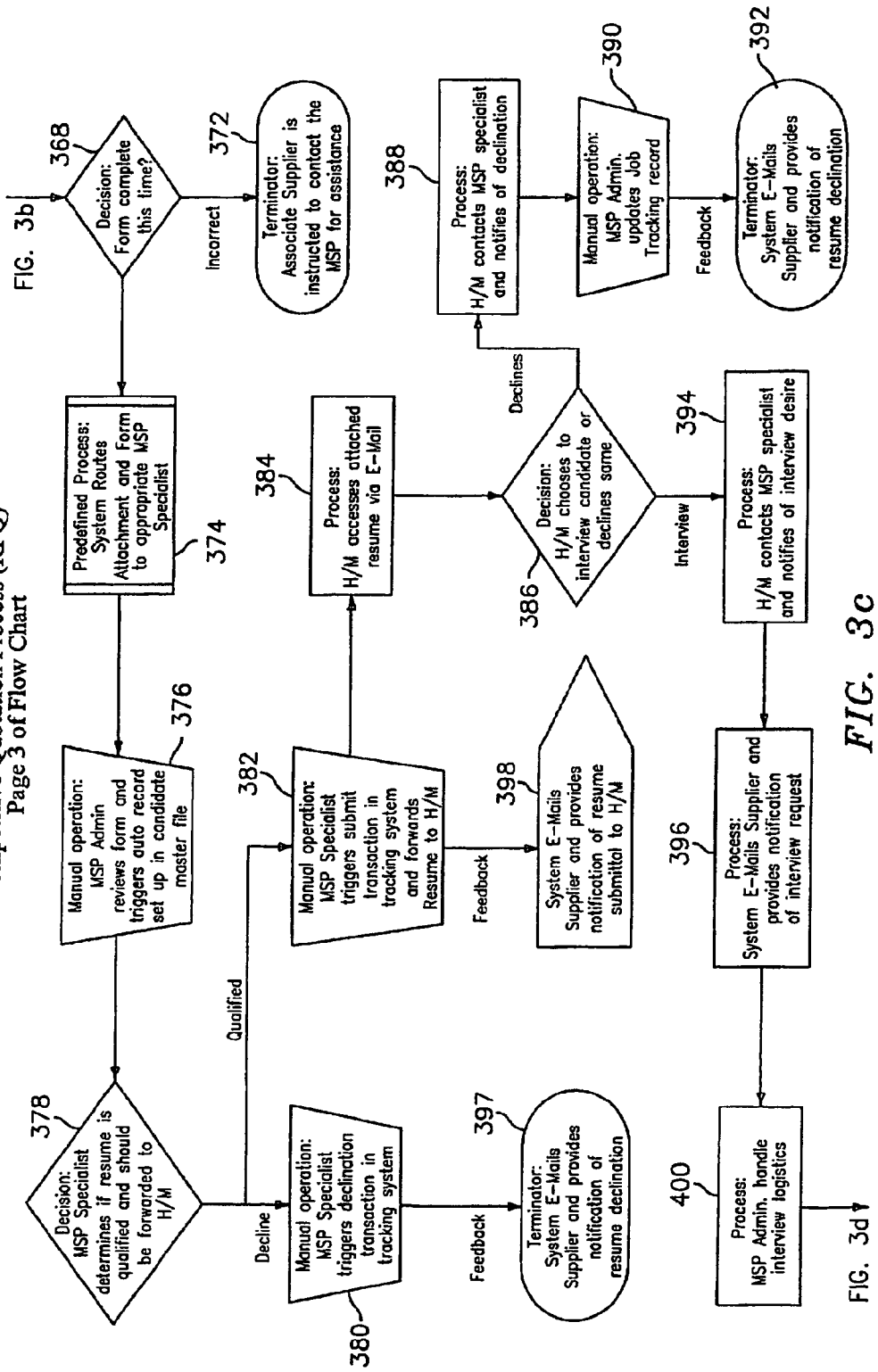
FIG. 3c is a continuation of the call flow diagram of FIG. 3b.

FIG. 3*c* discloses the continuation of the process of FIG. 3*b*. If the form is not completed, the step 372 directs the A/V to seek assistance. If the form is complete, step 374 routes the resume and form to an appropriate specialist. Upon receipt, the resume is reviewed and a record is set up in a master job applicant file in step 376. In step 378, the resume is manually qualified and it is determined if the resume should be forwarded to the H/M. If the resume is declined, step 380 updates the tracking system and the A/V is notified of the declination in step 397. Typically, if the resume is declined, the H/M is requested to provide a reason for declination.

Figure 3D:
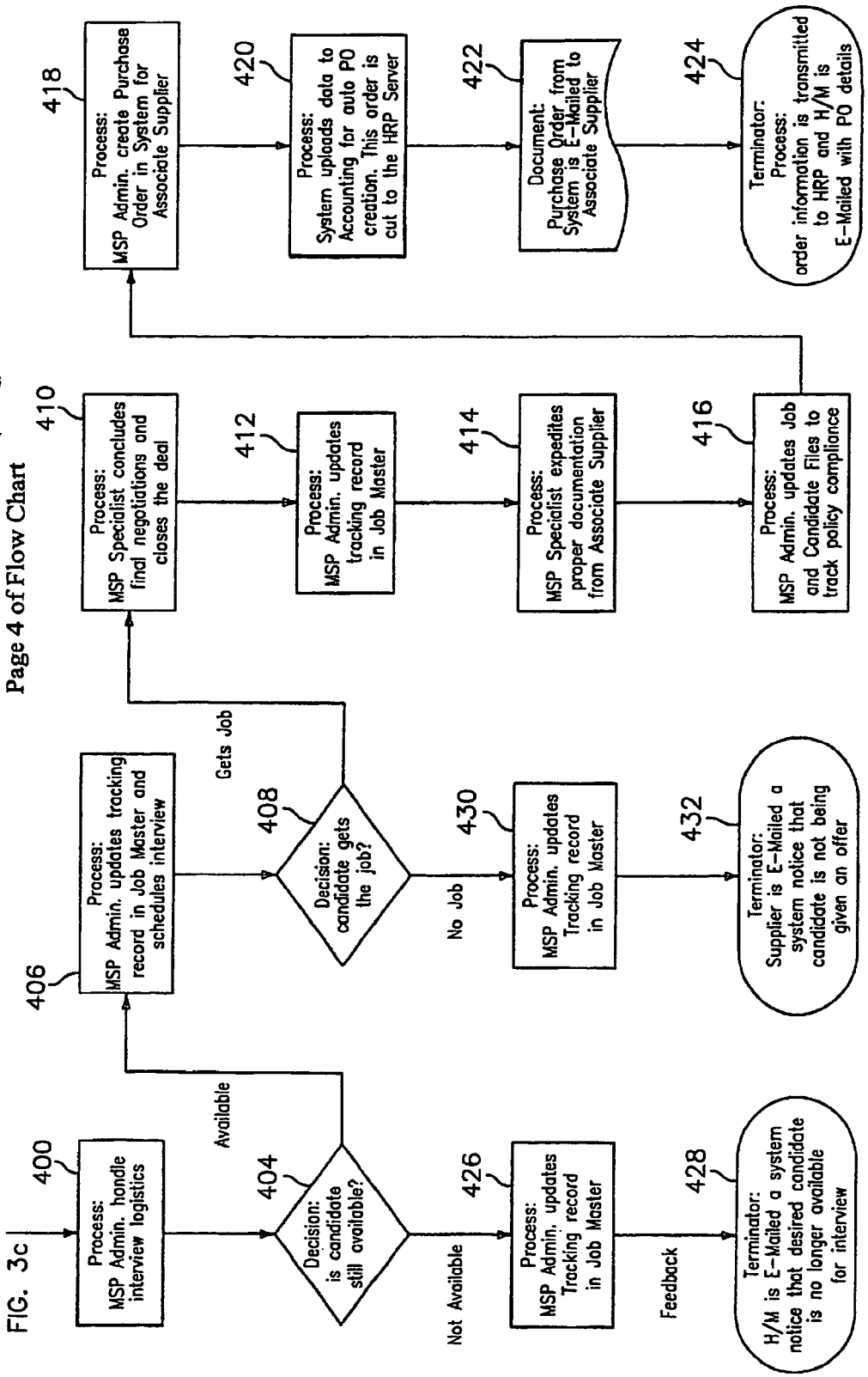
FIG. 3d is a continuation of the call flow diagram of FIG. 3c.

If the resume is qualified, the tracking system is updated in step 382 and step 398 notifies the A/V of the submittal to the H/M. The H/M accesses the qualified resume via email with a link directly to the application in step 384. In addition, background checks can be incorporated directly in the candidate profile, or provided via a direct link to the profile maintained by the background check agency. The manager can review the candidate resume online and at that point can decide to: 1) Make no decision (hold), 2) Decline, or 3) Request Interview in step 386. If no decision is made, the manger has the ability to return at a later time and make a decision If it is declined, step 388 asks the manager to give a reason for the declination, step 390 updates the tracking system and step 392 notifies the MSP personnel of the declination. If an interview is requested, the manager is asked for a preferred date and time. Step 394 notifies the on site specialist and of the request for an interview and step 396 notifies the A/V of the request for the interview. Step 400 then confirms a date and time with the vendor and manager. Interview information is available online to the manager and the vendor. Emails may also be sent to the vendor if the manager declines or puts on hold a resume. If the manager does not open a resume after a predetermined time period, the system will send them a friendly reminder of such. Email reminders may also be sent out before the scheduled interview. The hiring process continues with FIG. 3*d*.

Step 404 determines whether the candidate is still available for the interview. If not, step 426 updates the tracking system and step 428 notifies the H/M of the unavailability of the candidate. If the candidate is available, step 406 updates the tracking system. Step 408 determines whether the candidate gets the job. If not, step 430 updates the tracking system and step 432 notifies the A/V of the denial. If so, step 410 concludes the final negotiations and closes the deal. If a manager has not taken any action in a predetermined amount of time the system will send a second message or escalate the matter to an additional manager if needed.

Step 412 updates the tracking system indicating the close of the deal and step 414 requests employment documentation form the A/V. The system notifies the vendor to provide any additional information, such as the social security #, and confirm the start date, rate etc. that may be needed for processing. Step 416 updates the candidate file and tracking system to track hiring policy compliance with the client's business rules. Upon receipt of all the information, step 418 generates a Purchase Order for the A/V to retain the qualified applicant while step 420 uploads the data for payment. Generally, this purchase order is created in the client's back office accounting application via integration with the present invention. Additional methods of PO creation can include: manual entry, maser PO, or any other electronic and/or manual method. Step 422 forwards the purchase order from the system to the A/V. Lastly, step 424 notifies the H/M of the PO details.

Returning to FIG. 3*a*, if the H/M chooses to work on a completed requisition, step 330 determines whether the H/M wishes to change to an existing order or to make a direct source placement. If the H/M chooses the former, step 334 begins the change process. Step 436 of FIG. 3*e* determines whether additional approvals are required for the RFQ. If additional approvals are required beyond the H/M, the system will begin the authorization process. The approval hierarchy and business rules of the client are followed. The individual responsible for the approval will receive an email notifying him of the need for them to access the system to either approve or decline the request. If additional approvals are needed, the system will pass the approval process to the next level. There is a complete audit trail maintained, as well as system monitoring for timely approvals. Step 448 determines if the additional approval is received. If not, step 450 notifies the H/M and cancels the RFQ. If either no additional approval is required or the additional approval is granted, step 438 stores the RFQ in a file for review. Step 440 automatically generates a purchase order update routine in the system while step 442 uploads the modified PO in the system. Step 444 notifies the A/V of the PO and step 446 notifies the HRP server and H/M of the changes.

Returning to FIG. 3a, if the H/M chooses to work on a completed requisition, step 330 determines whether the H/M wishes to change to an existing order or to perform direct source placement. If the H/M chooses the latter, step 332 begins the new direct source placement process. Direct source placement refers to the direct hiring of a specific employee. This requisition requires the approval of an additional manager to approve the hiring and ensure that the hiring complies with all applicable business rules. Step 802 of FIG. 3f displays a notification of the rules and procedures that must be followed for direct source placement. In step 804, the H/M enters the required fields for a requisition for quote RFQ. Step 806 determines the A/V is set up in an approved vendor file. If the A/V is setup, step 810 stores the completed requisition and notifies an additional manager of the pending approval for a direct source requisition. Step 812 determines whether the additional manager has approved. If no approval is given, step 846 denies the RFQ. If the A/V is not setup, step 808 notifies the H/M that unapproved vendors can not be used without approval, while step 814 instructs the H/M that specific documentation is required to comply with business rules pertaining to managing technical non payroll workers. Step 816 stores a completed requisition and notifies the additional manager that a RFQ is pending. Step 818 instructs the additional manager as to what documentation is required prior to approval. Step 820 determines if the H/M has submitted the required documentation. If not, step 846 denies the RFQ.

If, in step 812, the additional manager has approved, step 822 stores the RFQ in a file. Step 824 accesses the RFQ and step 826 notifies the H/M that the required hard copy documents must be received before further can occur. Step 828 determines whether the required hard copies are received in 10 working days. If not, step 838 notifies the H/M and the A/V of the delay. Step 840 checks again whether the documents were received in ten working days. If not, step 844 cancels the RFQ. If so, step 830 generates a purchase order, and sets up the A/V, Candidate and job in the system. Step 832 uploads the PO data and the order is cut to the system. Step 834 emails the PO to the A/V and step 836 notifies the system and the H/M of the PO details.

Figure 4:
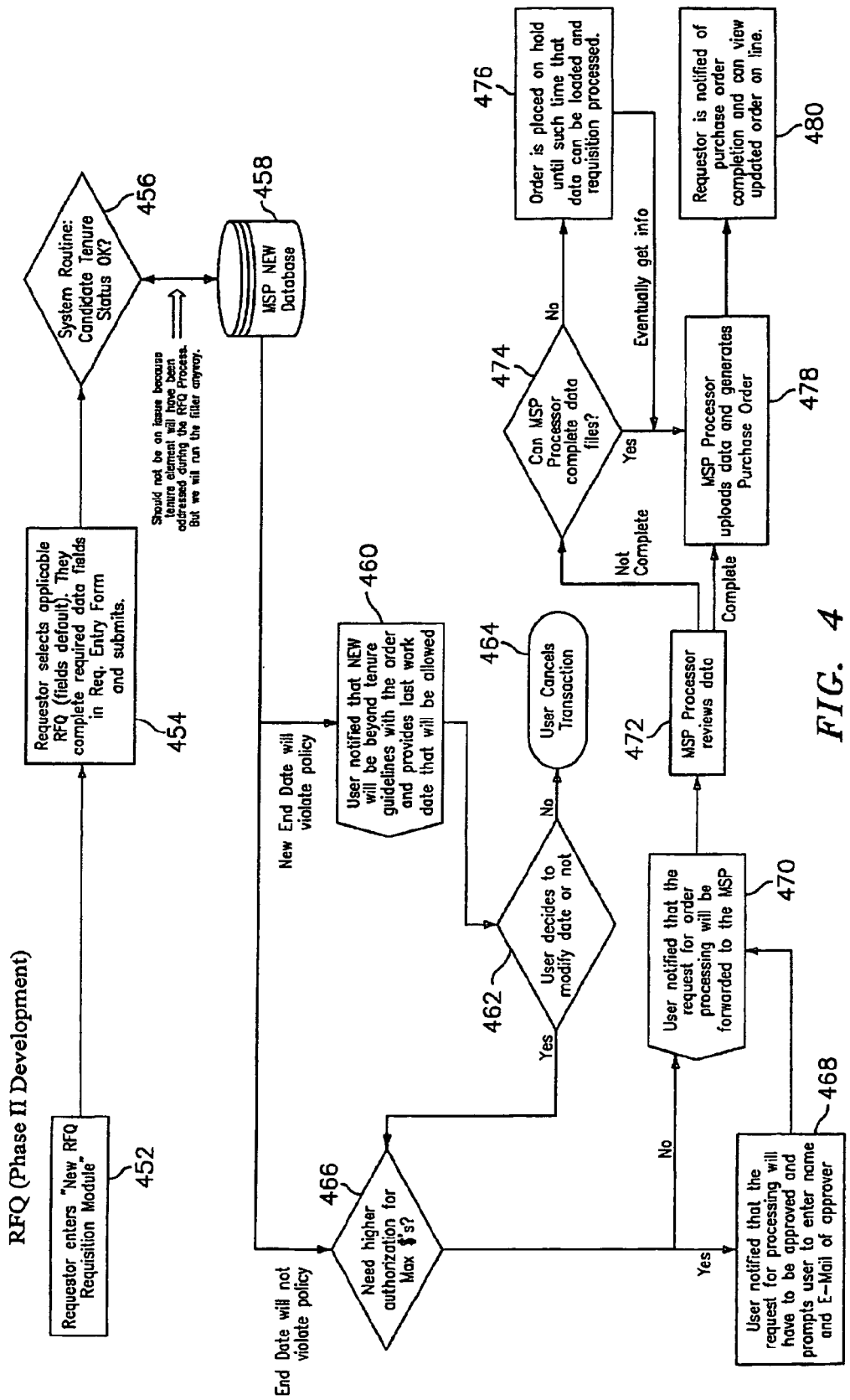
FIG. 4 is a call flow diagram illustrating an additional method for entering a new request for quote ("RFQ") according to the present invention.

FIG. 4 shows a call flow diagram illustrating a method for entering a new request for quote ("RFQ"). A requestor or H/M enters the new RFQ module in step 452. Step 454 selects the applicable RFQ fields and enters the required data. Step 456 determines whether the candidate tenure status is OK. The tenure status refers to whether or not a particular applicant has been employed and for how long. Some business rules require that an applicant may not work longer than a particular time. This process ensures that the tenure status of the applicant is updated and not violated. As part of a nightly system routine, the application may notify managers of contractors that are approaching tenure deadlines. Step 458 stores the new RFQ in an external database and checks the external database for previous employment history of the job applicant. If the new end date determined from the new RFQ would violate the tenure policy, step 460 notifies the H/M and generates the last day that the applicant can work. Step 462 determines whether the H/M decides to modify the last date. If not, step 464 cancels the transaction as it violates the tenure rules. If so, step 466 determines whether the H/M requires additional approval. In addition, if the end date does not violate tenure policy, the process proceeds to step 466. If approval is required, step 468 notifies the H/M that approval is required and prompts them to enter the name of the approving manager. If no approval is required, step 470 forwards the RFQ to MSP personnel and notifies the H/M of the same. Step 472 reviews the RFQ and step 474 determines whether the RFQ can be completed. If not, the order is placed on hold in step 476. If either the RFQ is completed or can be completed, 478 uploads the data and generates a PO. Step 480 notifies the H/M of the PO completion.

Figure 5:
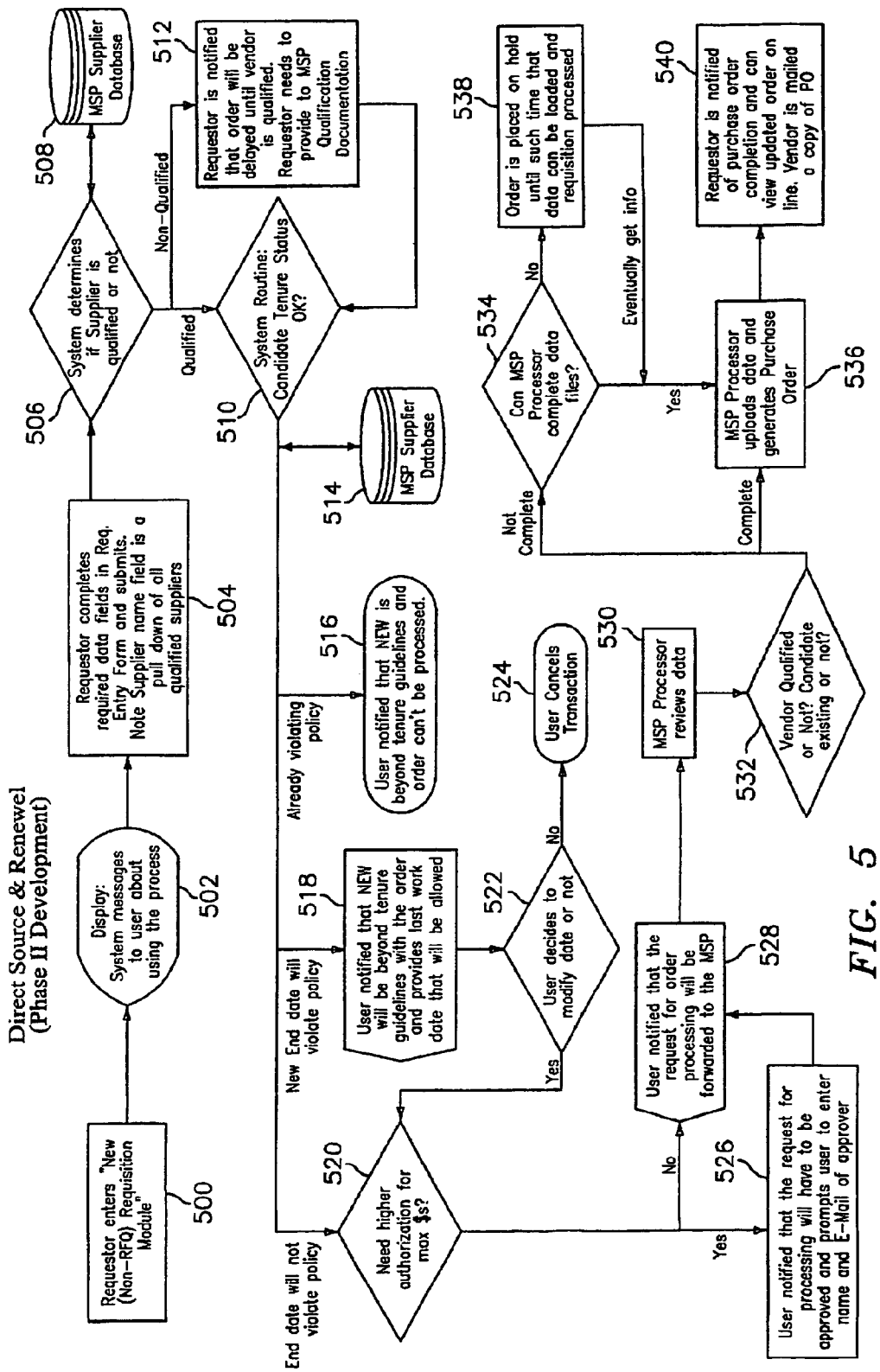
FIG. 5 is a call flow diagram illustrating an additional method for entering a new non-request for quote according to the present invention.

FIG. 5 shows a call flow diagram illustrating a method for entering a new non-RFQ, i.e. direct source and renewal. A requestor or H/M enters the new non-RFQ module in step 500. Step 502 displays information about using the system. Step 504 selects the applicable data fields and enters the required data including the A/V name. Step 506 determines whether the A/V is qualified or not. Step 508 stores die A/V supplier in a supplier database and supplies data to step 506. If the A/V is not qualified in step 506, Step 512 notifies the H/M that the processing will be delayed until the A/V is qualified and that the H/M must provide qualification documentation. Step 510 determines whether the candidate tenure status is OK. Step 514 stores the new non-RFQ and A/V in a database. If applicable, step 516 notifies the A/V that they already violate the tenure policy and that the new order cannot be processed. If, however, the new end date determined from the new non-RFQ would violate the tenure policy, step 518 notifies the H/M and generates the last day that the applicant can work. Step 522 determines whether the H/M decides to modify the last date. If not, step 524 cancels the transaction as it violates the tenure rules. If so, step 520 determines whether the H/M requires additional approval. In addition, if the end date does not violate tenure policy, the process proceeds to step 520. If approval is required, step 526 notifies the H/M that approval is required and prompts them to enter the name of the approving manager. If no approval is required, step 528 forwards the request for order processing to MSP personnel and notifies the H/M of the same. Step 530 reviews the non-RFQ data and step 532 determines whether the A/V is qualified and whether the candidate exists or not. If either of the information is missing, step 534 determines whether the non-RFQ can be completed. If it cannot be completed, the order is placed on hold in step 538. If the RFQ can be completed, step 536 uploads the data and generates a PO. Step 540 notifies the H/M of the PO completion and the A/V is mailed a copy of the PO.

Figure 6:
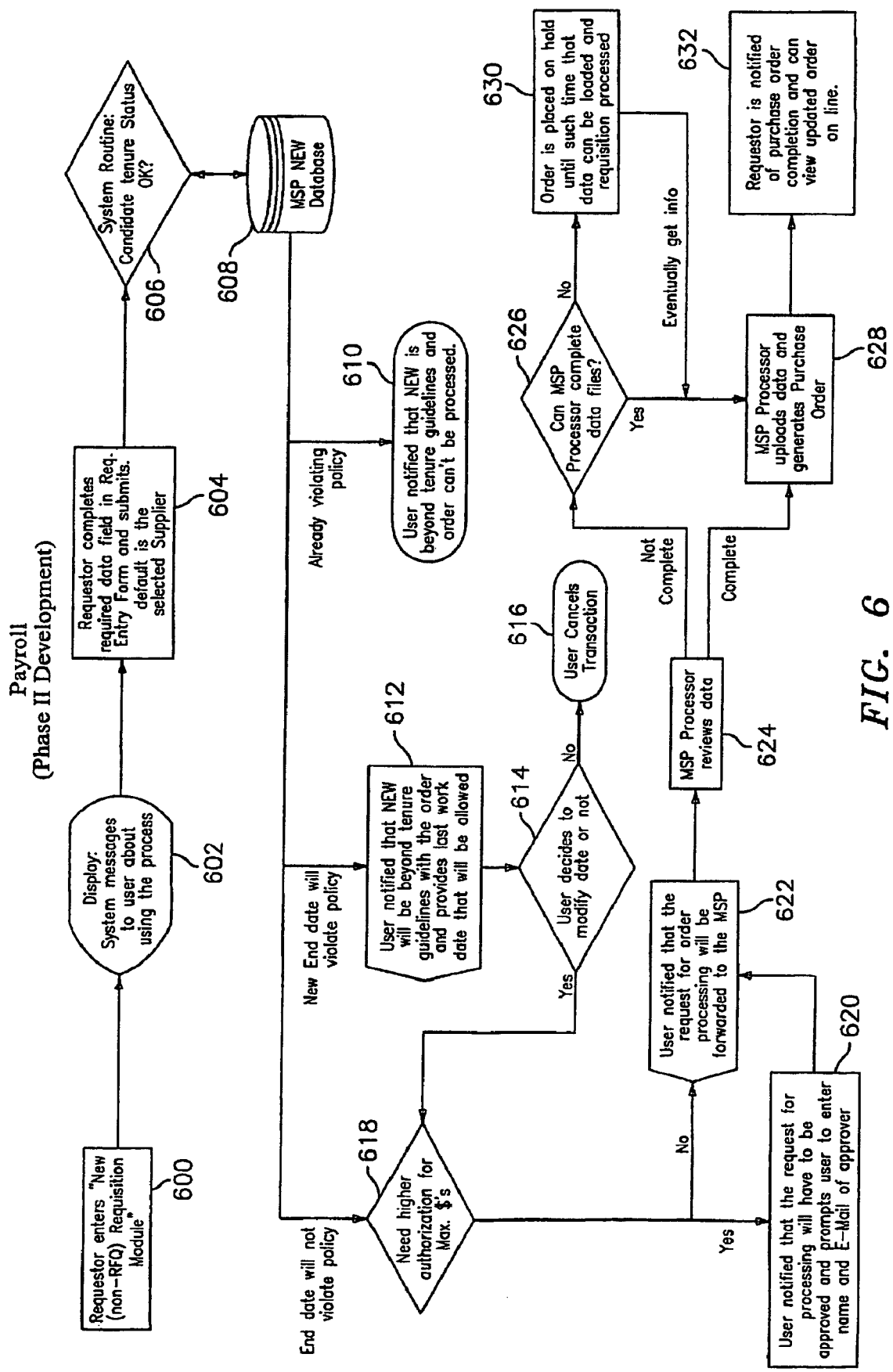
FIG. 6 is a call flow diagram illustrating an additional method for generating a purchase order invoice regarding the payment of temporary help according to the present invention.

FIG. 6 shows a call flow diagram illustrating a method for entering payroll with a new non-RFQ, i.e. direct source and renewal. Steps 600, 602 and 604 correspond to steps 500, 502 and 504 of FIG. 5 respectively. Steps 606-632 correspond to steps 456-480 respectively of FIG. 4. Step 610 notifies the A/V that they already violate the tenure policy and that the new order cannot be processed.

Figure 7A:
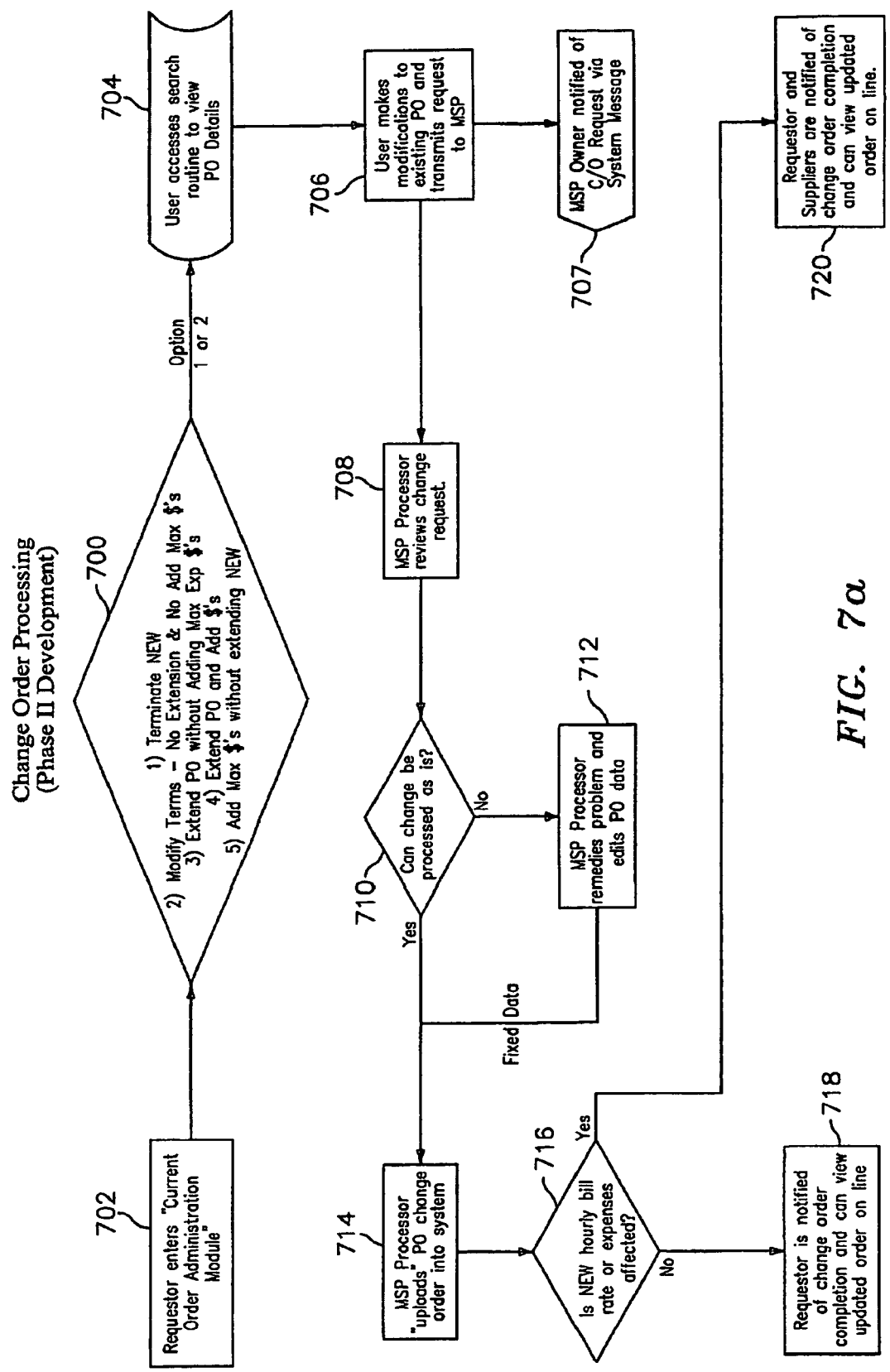
FIG. 7a is a call flow diagram illustrating a method for changing a purchase order according to the present invention.

FIG. 7a shows a call flow diagram illustrating a method for changing a purchase order according to the present invention. Step 702 enters an administration module and step 700 displays and determines which option the user selects. If options 1 or 2 are selected, step 704 accesses a search routine to locate a specified Purchase Order. Step 706 modifies the PO and transmits the PO to the system MSP personnel. Step 707 notifies the MSP personnel of the change and step 708 reviews the changed PO. Step 710 determines whether the PO can be processed as is. If not, step 712 requests correction and edits the PO. If so, step 714 uploads the PO to the system. Step 716 determines whether a new hourly rate or other expenses are affected. If not, step 718 notifies the user of the change order completion. If so, step 720 notifies the user and the A/V of the completion of the PO change order.

Figure 7B:
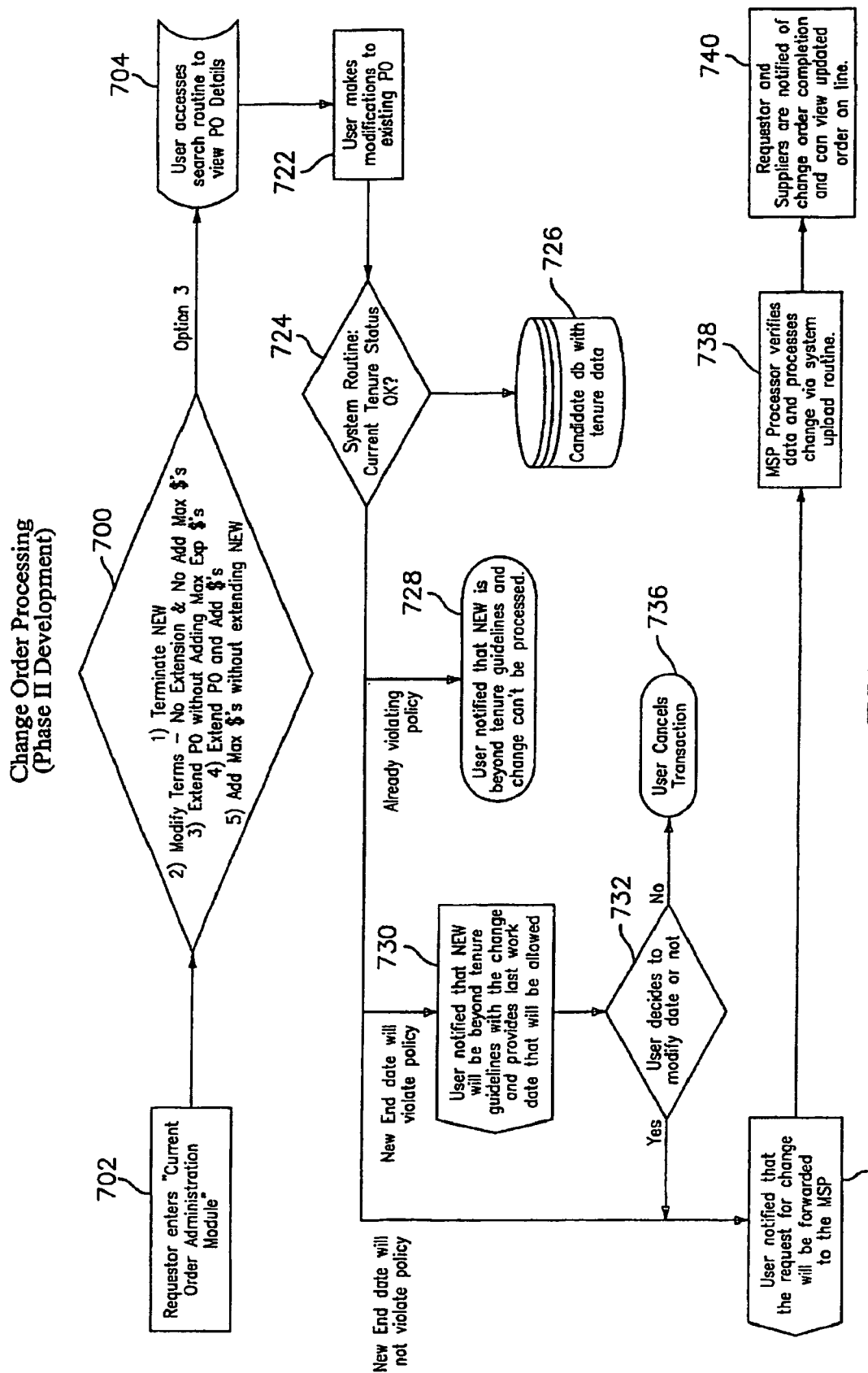

Referring to FIG. 7b, if option 3 is selected, step 704 performs a search to locate the specified Purchase Order. Step 722 modifies the existing PO. Since option three extends the term of the PO, a check regarding the tenure rules must be performed. Step 724 determines whether the PO and candidate tenure status is OK. Step 726 stores the PO and tenure data in a candidate DB. If applicable, step 728 notifies the A/V that they already violate the tenure policy and that the new order cannot be processed. If, however, the new end date determined from the new changed RFQ would violate the tenure policy, step 730 notifies the H/M and generates the last day that the applicant can work. Step 732 determines whether the H/M decides to modify the last date. If not, step 736 cancels the transaction as it violates the tenure rules. If so, step 734 forwards the request for the changed PO to MSP personnel and notifies the H/M of the same. In addition, if the end date does not violate tenure policy, the process proceeds to step 734. Step 738 verifies the data and uploads the new changed PO to the system. Step 740 notifies the user and A/V of the changed PO completion and allows online viewing of the new PO.

Figure 7C:
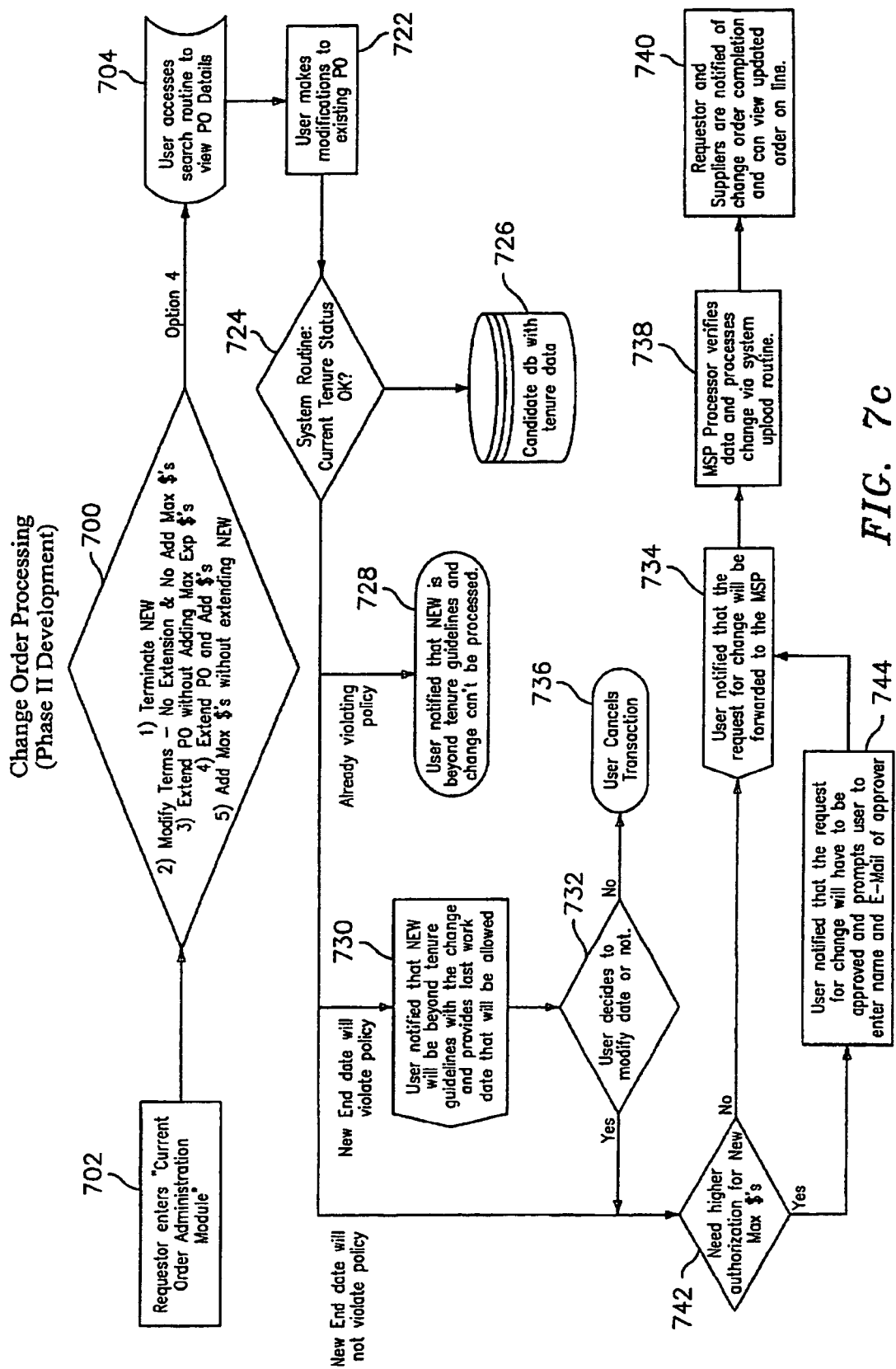

Referring to FIG. 7c, if option 4 is selected, the process follows the same steps as disclosed in FIG. 7b, however, if the new end date does not violate the end date or the user decides to modify the date, step 742 determines if additional authorization is required. Since option 4 extends the PO, the tenure status must be checked as disclosed in FIG. 7b. In addition, since funds are added to the PO, the added funds must be approved. If no approval is required, steps 734, 738 and 740 are performed. If approval is required, step 744 notifies the user, H/M, of the need for approval and prompts them for the name and email of the approving manager.

Figure 7D:
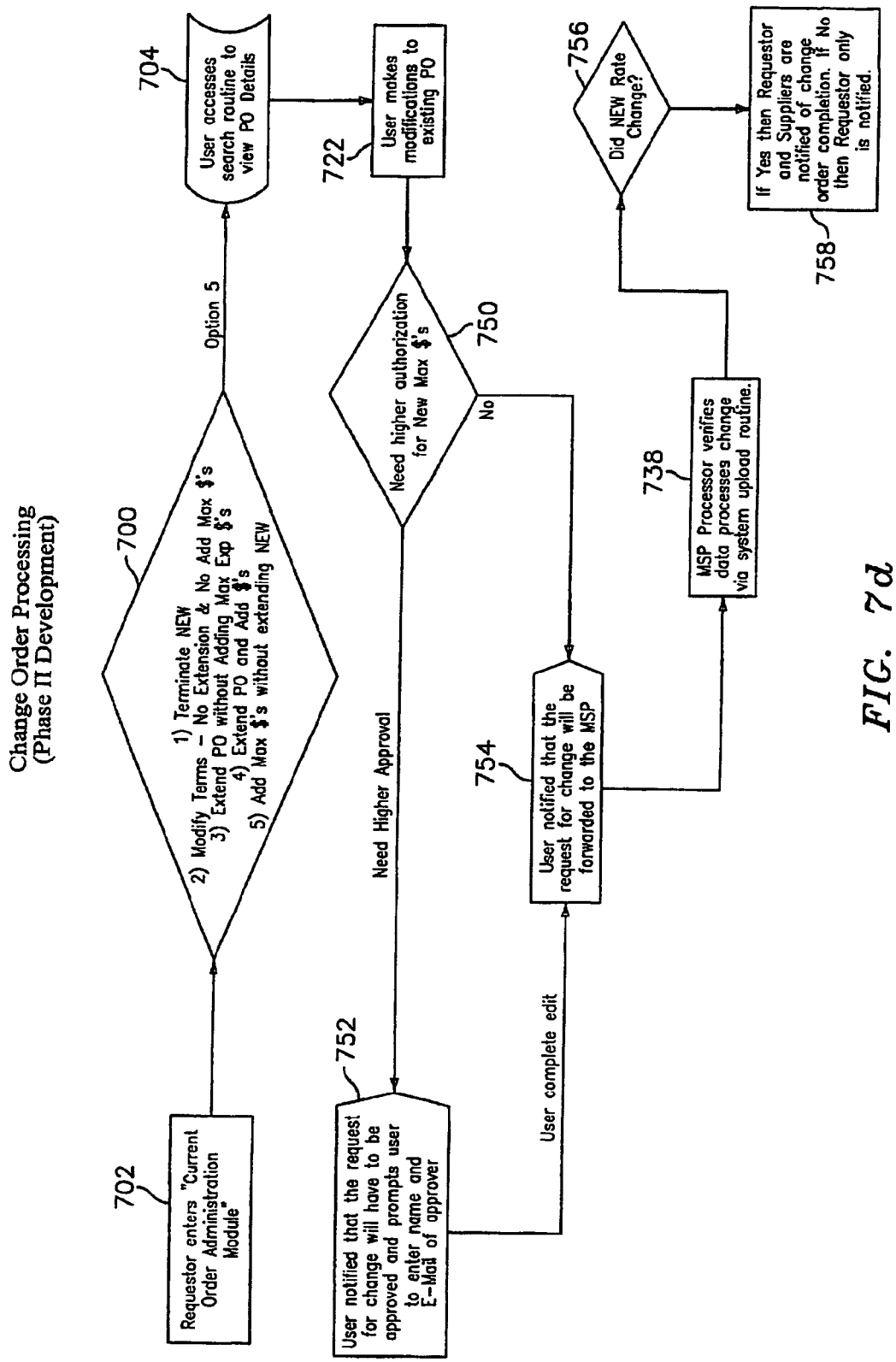

Referring to FIG. 7d, if option 5 is selected, the process follows the same steps of 702, 700, 704, and 722 as described in FIG. 7c. Since option 5 adds a new Maximum limit on finds, step 750 determines whether an authorization is required for the change. If approval is required, step 752 notifies the user, H/M, of the need for approval and prompts them for the name and email of the approving manager. If no approval is required, step 754 forwards the request for the changed limit to MSP personnel and notifies the H/M of the same. Step 738 verifies the data and uploads the new changed funding limit to the system. Step 756 determines whether a new rate changed. If so, step 758 notifies the user and A/V of the changed PO completion. If not, only the user is notified of the change.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure as defined in the appended claims.

GLOSSARY OF TERMS

NPW—Non-Payroll Worker
MSP—Managed Service Program
RFQ—Request for quote
H/M—Hiring Manager
TNPW—Technical Non-Payroll Worker
A/V—Associated Vendor
SAP—Software application for Backend Accounting
GPO—Global Procurement Organization What it is claimed:

1. A system for Internet based procurement of non-cataloged goods and services based upon qualified resumes, comprising:
    a human resources procurement server;
    a plurality of associate vendor terminals connected to said human resources procurement server via the Internet, each of the plurality of associate vendor terminals having access to information related to a plurality of job applicants;
    a job database connected to the human resources procurement server and the plurality of associate vendor terminals;
    a hiring manager terminal connected to the human resources procurement server via the Internet, wherein the hiring manager terminal is associated with an employer;
    wherein each associate vendor terminal of the plurality of associate vendor terminals is associated with an associate vendor that is outside the employer;
    wherein the human resources procurement server permits a user of the hiring manager terminal to choose between manual entry of a technical non-payroll worker and working on a completed requisition;
    wherein, responsive to the user choosing said manual entry, the human resources procurement server is operable to:
        receive at least one job request from said hiring manager terminal;
        store the at least one job request in the job database;
        allow selected associated vendor terminals of the plurality of associate vendor terminals to access the at least one job request via the job database;
        wherein the selected associate vendor terminals comprise those associate vendor terminals authorized by the hiring manager terminal to access the at least one job request responsive to criteria submitted from the hiring manager terminal;
        receive at least one qualified resume from at least one associate vendor terminal of the selected associate vendor terminals, the at least one qualified resume having been matched to the at least one job request by an associate vendor associated with the at least one associate vendor terminal;
        forward said qualified resume to said hiring manager terminal for review; and
        transmit a request for an interview to the at least one associate vendor terminal if said qualified resume is acceptable;
    wherein, responsive to the user choosing said working on a completed requisition, the human resources procurement server is operable to:
        permit the user to choose whether said working on a completed requisition is a change order to an existing engagement or a direct source placement;
        wherein said change order to an existing engagement comprises a change to a stored purchase order related to the existing engagement; and
        wherein said direct source placement comprises selection of a specific job applicant from a specific one of a plurality of associate vendors for a specific job per information received from the hiring manager terminal.

2. The system according to claim 1, wherein said hiring manager terminal receives said qualified resume and generates a request to said at least one associate vendor terminal for an interview with said qualified resume applicant if requested by said hiring manager terminal.

3. The system according to claim 2, wherein said hiring manager terminal generates a notification message to said at least one associate vendor terminal indicating that said qualified resume applicant has been accepted for employment.

4. The system according to claim 3 further comprising a time and billing server, connected to said human resources procurement server, that receives a plurality of time slips from said at least one associate vendor terminal pertaining to time worked for said accepted qualified resume applicant and generates an invoice to said hiring manager terminal for payment.

5. The system according to claim 4 further comprising a bank server, connected to said human resources procurement server and said hiring manager terminal, that receives authorization from said hiring manager terminal to pay said invoice to said human resources procurement server.

6. The system according to claim 1, wherein said human resources procurement server further comprises:
a central processing unit that controls the overall operation of said human resources procurement server;
a memory that stores a control program to operate said human resources procurement server and that temporarily stores said qualified resume; and
a modem, connected to the Internet and to said central processing unit, that facilitates the transfer of said qualified resume from said at least one associate vendor terminal to said hiring manager terminal.

7. The system according to claim 6, wherein said central processing unit restricts access of said at least one associate vendor terminal to said job database based upon criteria submitted from said hiring manager terminal.

8. The system according to claim 7, wherein said criteria is selected from a group of criteria which includes said at least one associate vendor terminal's geographic location and area of expertise.

9. The system according to claim 1, wherein said plurality of associate vendor terminals access said human resources procurement server via the Internet.

10. The system according to claim 1, wherein said hiring manager terminal accesses said human resources procurement server via the Internet.

11. The system according to claim 1, wherein the human resources procurement server utilizes data to establish a hiring-manager list of approved associate vendors.

12. The system according to claim 11, wherein the data utilized comprises:
geographic non-payroll laborer resource provision authority;
skill set non-payroll laborer resource provision authority;
job category non-payroll laborer resource provision authority; and
job title non-payroll laborer resource provision authority.

13. The system according to claim 11, wherein the data utilized comprises:
vendor-preferred tier labor resource provision level; and
client business-unit preferred-vendor sourcing-preference list.

14. The system of claim 1, wherein, responsive to the user choosing said direct source placement, the human resources procurement server processes a direct-source purchase requisition received from the hiring manager terminal.

15. The system of claim 14, wherein the human resources procurement server specifies direct-source purchase requisition data comprising at least one of non-payroll worker identity, vendor identity, assignment location, job title, job description, related job skills, assignment start date, assignment end date, temporary laborer billing rate, and anticipated assignment labor hours.

16. A method for Internet based procurement of non-cataloged goods or services based upon qualified resumes, comprising the steps of:
processing, at a human resources procurement server, a first designation from a hiring manager between manual entry of a technical non-payroll worker and working on a completed requisition;
wherein the human resources procurement server is connected to a plurality of associate vendors and the hiring manager via the Internet, each of the plurality of associate vendors having access to information related to a plurality of job applicants;
wherein the hiring manager is associated with an employer;
wherein each associate vendor of the plurality of associate vendors is outside the employer;
responsive to the first designation being said working on a completed requisition:
processing, at the human resources procurement server, a second designation received via the Internet from the hiring manager of whether said working on a completed requisition is a change order to an existing engagement or a direct source placement of a specific employee;
wherein said completed requisition identifies at least one associate vendor selected from the plurality of associate vendors per criteria received from the hiring manager;
wherein said change order to an existing engagement comprises a change to a stored purchase order related to the existing engagement; and
wherein said direct source placement comprises selection of a specific job applicant from a specific one of said plurality of associate vendors for a specific job per information received from the hiring manager;
responsive to the first designation being said manual entry of a technical non-payroll worker:
receiving, at the human resources procurement server, a job description for a temporary employment position from the hiring manager via the Internet;
storing the job description in a job description database;
allowing selected associated vendors of the plurality of associate vendors to access the job description via the job description database;
wherein the selected associate vendors comprise those associate vendors authorized by the hiring manager to access the job description responsive to criteria submitted from the hiring manager;
receiving, at the human resources procurement server, a qualified resume of a job applicant from at least one associate vendor of the selected associate vendors via the Internet, the qualified resume having been matched to the job description by the at least one associate vendor;
transmitting the qualified resume from the human resources procurement server to the hiring manager for approval via the Internet; and
transmitting a request for an interview to the at least one associate vendor if said job applicant is acceptable.

17. The method according to claim 16 further comprising the steps of:
sending notification of a confirmed interview to the hiring manager; and
notifying said at least one associate vendor whether said job applicant is approved for employment.

18. The method according to claim 17, further comprising the steps of:
receiving approval of said job applicant for employment;
requesting necessary employment information regarding said job applicant; and generating a purchase order for said job applicant to begin work.

19. The method according to claim 18, further comprising the steps of:
accepting at least one time card representing time worked on a particular job;
generating an invoice requesting payment for said at least one time card; and
forwarding said invoice to said hiring manager for approval and payment.

20. The method according to claim 19, further comprising the step of automatically approving said invoice if said hiring manager does not respond within a predetermined period of time.

21. The method according to claim 16, wherein said step of submitting the job description further includes the steps of displaying said job description to the at least one associate vendor and requesting additional information from said hiring manager if said job description is unclear.

22. The method according to claim 21, wherein said step of displaying said job description further includes the step of displaying only those job descriptions that said hiring manager has authorized said at least one associate vendor to view.

23. The method according to claim 16, further comprising the steps of:
generating a record that records the status of said job applicant; and
viewing said record to determine the current employment status of said job applicant, the length of time job applicant has been employed at a particular position, and an applicant's availability for an interview.

24. The method according to claim 16, further comprising the step of generating a reminder to said hiring manager if no request for an interview is received within a predetermined period of time.

25. The method according to claim 16, wherein said step of transmitting said qualified resume further includes the step of adhering to a plurality of business rules submitted by said hiring manager prior to transmitting said qualified resume.

26. The method according to claim 25, wherein said plurality of business rules is selected from the group consisting of a minimum and a maximum amount of total consecutive time a job applicant may work at a particular employer, the prohibition of hiring a previously discharged job applicant or the standard salary rate for a particular job description.

27. The method of claim 16, wherein the providing comprises utilizing data to establish a client list of approved associate vendors, the approved associate vendors comprising the plurality of associate vendors.

28. The method of claim 27, wherein the data utilized comprises:
geographic non-payroll laborer resource provision authority;
skill set non-payroll laborer resource provision authority;
job category non-payroll laborer resource provision authority; and
job title non-payroll laborer resource provision authority.

29. The method of claim 27, wherein the data utilized comprises:
vendor-preferred tier labor resource provision level; and
client business-unit preferred-vendor sourcing-preference list.

30. The method of claim 16, further comprising, responsive to the second designation being said direct source placement, the human resources procurement server processing a direct-source purchase requisition received from the hiring manager over the Internet.

31. The method of claim 30, wherein the human resources procurement server specifies direct-source purchase requisition data comprising at least one of non-payroll worker identity, vendor identity, assignment location, job title, job description, related job skills, assignment start date, assignment end date, temporary laborer billing rate, and anticipated assignment labor hours.

* * * * *

UNITED STATES PATENT AND TRADEMARK OFFICE
CERTIFICATE OF CORRECTION

PATENT NO. : 8,190,462 B2  
APPLICATION NO. : 11/698603  
DATED : May 29, 2012  
INVENTOR(S) : Victor Brief et al.

Page 1 of 2

It is certified that error appears in the above-identified patent and that said Letters Patent is hereby corrected as shown below:

In the Specification

Column 2, Line 58

Replace "Interet"  
With -- Internet --

Column 4, Line 42

Replace "Interet"  
With -- Internet --

Column 5, Line 47

Replace "timecard"  
With -- timecards --

Column 6, Line 30

Replace "contactor"  
With -- contractor --

Column 6, Line 36

Replace "tirecard"  
With -- timecard --

Signed and Sealed this  
Twenty-sixth Day of November, 2013

Margaret A. Focarino  
*Commissioner for Patents of the United States Patent and Trademark Office*

CERTIFICATE OF CORRECTION (continued)
U.S. Pat. No. 8,190,462 B2

Column 8, Line 43

Replace "maser"
With -- master --

Column 9, Line 15

Replace "determines the"
With -- determines if the --

Column 10, Line 13

Replace "die"
With -- the --

Column 11, Line 33

Replace "finds"
With -- funds --